(12) United States Patent
Pingali et al.

(10) Patent No.: US 11,816,596 B2
(45) Date of Patent: Nov. 14, 2023

(54) PROCESS DISCOVERY AND OPTIMIZATION USING TIME-SERIES DATABASES, GRAPH-ANALYTICS, AND MACHINE LEARNING

(71) Applicant: Apps Consultants Inc., Centennial, CO (US)

(72) Inventors: Ashwin K. Pingali, Parker, CO (US); Ravi Kiran Ponduri, Centennial, CO (US); Venkata Krishna Pradeep Ponduri, Centennial, CO (US); Ramkumar Narayanswamy, Boulder, CO (US)

(73) Assignee: Apps Consultants Inc., Centennial, CO (US)

( * ) Notice: Subject to any disclaimer, the term of this patent is extended or adjusted under 35 U.S.C. 154(b) by 199 days.

(21) Appl. No.: 17/185,496

(22) Filed: Feb. 25, 2021

(65) Prior Publication Data

US 2021/0264332 A1   Aug. 26, 2021

Related U.S. Application Data

(60) Provisional application No. 62/981,323, filed on Feb. 25, 2020.

(51) Int. Cl.
*G06Q 10/0631* (2023.01)
*G06N 3/08* (2023.01)
*G06N 3/04* (2023.01)

(52) U.S. Cl.
CPC .......... *G06Q 10/0631* (2013.01); *G06N 3/04* (2013.01); *G06N 3/08* (2013.01)

(58) Field of Classification Search
CPC ........ G06Q 10/0631; G06N 3/04; G06N 3/08; G06N 3/0454; G06N 20/00; G06N 7/005; G06N 5/045; G06N 5/022
See application file for complete search history.

(56) References Cited

U.S. PATENT DOCUMENTS

| | | | |
|---|---|---|---|
| 8,229,775 B2 * | 7/2012 | Adler | G06Q 10/06 705/7.11 |
| 8,250,521 B2 | 8/2012 | Zhang et al. | |
| 8,645,276 B2 | 2/2014 | Wong et al. | |

(Continued)

*Primary Examiner* — Dylan C White
(74) *Attorney, Agent, or Firm* — Anand P Narayan; Yantra Patents LLC

(57) ABSTRACT

Implementations described herein relate to methods, systems, and computer-readable media to generate an alert or recommendation based on an activity log. In some implementations, a computer-implemented method includes receiving, at a processor, an activity log associated with one or more enterprise sub-processes for a first time period, determining, at the processor, change context data based on a comparison of the entity data and the associated interaction data with corresponding entity data and associated interaction data of a second time period, analyzing the change context data to determine atomic event data, providing the atomic event data associated with the enterprise process as input to a trained machine learning model, determining, using the trained machine learned model and the atomic event data, a predicted future state of the enterprise process, and generating and transmitting an alert or recommendation to one or more data sinks associated with the enterprise process.

17 Claims, 18 Drawing Sheets

(56) References Cited

U.S. PATENT DOCUMENTS

| | | | |
|---|---|---|---|
| 9,053,437 B2 | 6/2015 | Adler et al. | |
| 10,073,895 B2 | 9/2018 | Rinke et al. | |
| 10,083,073 B2 | 9/2018 | Ambichl et al. | |
| 10,116,670 B2 | 10/2018 | Muddu et al. | |
| 10,162,861 B2 | 12/2018 | Rinke et al. | |
| 10,375,098 B2 * | 8/2019 | Oliner | H04L 63/1425 |
| 10,706,378 B2 | 7/2020 | Rinke et al. | |
| 10,796,257 B2 * | 10/2020 | Rinke | G06Q 10/0633 |
| 11,456,080 B1 * | 9/2022 | Jain | A61B 5/7264 |
| 2006/0184410 A1 | 8/2006 | Ramamurthy et al. | |
| 2020/0126126 A1 * | 4/2020 | Briancon | G06N 5/01 |
| 2022/0292525 A1 * | 9/2022 | Ash | G06F 16/951 |

* cited by examiner

| Serial No. | Transaction ID | Customer (Entity) Identifier | Item Group | Item | Interaction | Interaction metadata (Device Type, Source Channel) | Time stamp | Quantity | Total |
|---|---|---|---|---|---|---|---|---|---|
| 1 | CEB1245 | 11 | 1 | 5 | Add | (1,5) | 2/3/21-11:01:01 | 0 | 0 |
| 2 | CNB5245 | 10 | 1 | 5 | Add | (1,7) | 2/4/21-10:01:06 | 0 | 0 |
| 3 | CEB1145 | 23 | 1 | 5 | Purchase | (8,5) | 2/4/21-10:05:11 | 1 | 10 |
| 4 | CEB9145 | 11 | 1 | 5 | Purchase | (3,5) | 2/5/21-12:02:10 | 10 | 20 |
| 5 | CEB1168 | 23 | 1 | 5 | Return | (3,7) | 2/7/21-14:01:01 | 0 | 0 |
| N | CNB1168 | 2 | 1 | 5 | Purchase | (3,7) | 2/7/21-18:01:01 | 3 | 5 |

PROCESS DISCOVERY AND OPTIMIZATION USING TIME-SERIES DATABASES, GRAPH-ANALYTICS, AND MACHINE LEARNING

CROSS-REFERENCE TO RELATED APPLICATION

This application claims priority to U.S. Provisional Patent Application No. 62/981,323, filed Feb. 25, 2020, titled "SYSTEMS AND METHODS FOR PROCESS DISCOVERY AND OPTIMIZATION USING TIME-SERIES AND GRAPH DATABASES" and which is incorporated by reference herein in its entirety.

TECHNICAL FIELD

Embodiments relate generally to an autonomous learning agent for process discovery, model building and triggering actions for process optimization based on activity logs.

BACKGROUND

Enterprise systems are utilized by entities such as corporations, businesses, non-profits, etc. who typically consume resources and produce products/services that add values that can be monetized. An example is a for profit-business which produces goods, sells these goods and generates a profit/loss. The operation and performance of such a business-system can be represented by metrics such as revenue generated, costs incurred, customer acquisition, rate of new products launched, rate of purchasing, rate of inventory turns, customer churn Rates, Cash Burn rates, etc.

To create value, an organization produces a primary product/service that serves the needs of its customers. This product or service offering follows a set of processes. In addition to processes that produce this core product/service, the organization also needs various supporting processes; for example, communicating the product/service value to its customers, acquiring the funds by raising capital from investors, collecting funds from customers after the service is delivered, rendering customer service, procuring material and services that are needed to produce the core product/service, etc.

Typical enterprise processes include processes such as a sales process, procurement process, and hiring process. Each process may have multiple states which have to be crossed as it moves from start to finish. A sales cycle can start with a marketing-campaign, to various customer-engagements steps and finally recognizing revenue from that engagement. Each state is characterized by a specific set of events such as a request for quote or product-shipment and the state-changes are contingent on completing the specific set of events.

While most modern companies utilize enterprise computing systems, these systems tend to operate in walled-gardens within their specific organization and may not operate across the entire organization. Often getting a process characterized across these systems is not possible due to security issues, data-formats and lack of infrastructure personnel resources.

Implementations described herein were conceived in the context of these problems and the necessity for technical solutions for a business to take a multitude of localized actions which will provide the best overall outcome.

SUMMARY

Implementations described herein relate to process discovery and optimization using time-series databases, graph-analytics, and machine learning.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes receiving. The receiving also includes determining, at the processor, change context data based on a comparison of the entity data and the associated interaction data with corresponding entity data and associated interaction data of a second time period; analyzing the change context data to determine atomic event data associated with the enterprise process based on detection of one or more of: a change in state of the one or more entities or a change in state of one or more interactions of the one or more entities included in the change context data; providing the atomic event data associated with the enterprise process as input to a trained machine learning model; determining, using the trained machine learned model and the atomic event data, a predicted future state or states of the enterprise process; generating, based on the predicted future states of the enterprise process, an alert or recommendation; and transmitting, the alert or recommendation to one or more data sinks associated with the enterprise process. Other embodiments of this aspect include corresponding computer systems, apparatus, and computer programs recorded on one or more computer storage devices, each configured to perform the actions of the methods.

Implementations may include one or more of the following features. The method may include: prior to receiving the activity log, providing as input to the machine learning model, data that includes one or more training activity logs and realized states of the enterprise process corresponding to the training activity logs; generating, by the machine learning model, one or more predicted states of the enterprise process; comparing the one or more predicted states with respective realized states of the enterprise process; and adjusting one or more parameters of the machine learning model based on the comparison. The analyzing the change context data to determine atomic event data may include: identifying change context data elements in the change context data that are associated with a particular entity; determining a subset of the change context data elements that are associated with a change in the state of the particular entity; and classifying the subset of change context data elements as an atomic event for the particular entity. Generating the process map may include: obtaining event data of one or more entities included in the event data; for each of the one or more entities: ordering the event data for a respective entity based on timestamps included in the event data; and determining a frequency of occurrence of one or more events in the event data for the respective entity; aggregating the ordered event data and the corresponding frequency of occurrence; and generating the process map based on the aggregated ordered event data and the frequency of occurrence. The method may include: obtaining a reference process map for the enterprise process; comparing the process map to the reference process map to determine a deviation; generating a fraud alert based on a determination that the deviation meets a threshold deviation. Generating the state transition model may include: identifying one or more states of a plurality of entities included in the atomic event data; determining a frequency of occurrence of a respective state transition between the one or more states for each of the plurality of entities; and determining a combined state transition probability for each of the states based on aggregating the respective state transitions across the plurality of entities. Determining the predicted future state may include simulating a predicted future state of the enterprise process based on a current state of the enterprise process and the state transition model for the enterprise process. The method may include learning a joint probability distribution of one or more parameters indicative of a state of the enterprise process based on one of more states of the plurality of entities and one or more interaction states of the plurality of entities, using a neural network. Generating the alert or recommendation may include: obtaining the one or more parameters corresponding to the predicted future state of the enterprise process obtained from the previously learnt neural network; comparing the one or more parameters to corresponding predetermined threshold values for the one or more parameters; and generating the alert or recommendation based on any one of the one or more parameters not meeting the predetermined threshold values. The method may include determining conditional state transition probabilities for each of the one or more states conditioned on entity metadata associated with each of the one or more states. The method may include generating an action recommendation for an entity based on a particular conditional state transition probability of a state of the entity and a determination that performing the action recommendation is associated with a preferred predicted future state of the enterprise process. The enterprise process is a manufacturing process, and where receiving the activity log associated with one or more enterprise sub-processes may include receiving sensor data from one or more sensors installed in equipment utilized in the manufacturing process. Implementations of the described techniques may include hardware, a method or process, or computer software on a computer-accessible medium.

One general aspect includes a computer-implemented method to train a machine learning model to learn and predict future states of an enterprise process. The computer-implemented method also includes providing as input to the machine learning model, data that includes one or more activity logs and one or more realized states of the enterprise process; generating, by the machine learning model, one or more predicted states of the enterprise process; comparing the one or more predicted states with respective realized states of the enterprise process; and adjusting one or more parameters of the machine learning model based on the comparison. Other embodiments of this aspect include corresponding computer systems, apparatus, and computer programs recorded on one or more computer storage devices, each configured to perform the actions of the methods.

Implementations may include one or more of the following features. The method where adjusting one or more parameters of the machine learning model based on the comparison may include: generating, by the machine learning model, the one or more predicted states of the enterprise process associated with a plurality of distribution functions; determining a cost associated with each of the plurality of distribution functions; selecting a particular distribution function of the plurality of distribution functions with the least cost; and adjusting one or more parameters of the particular distribution function. The machine learning model is a deep neural network. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: receiving, at a processor, an activity log associated with one or more enterprise sub-processes of an enterprise process for a first time period, where the activity log includes entity data of one or more entities and associated interaction data of the one or more entities; determining, at the processor, change context data based on a comparison of the entity data and the associated interaction data with corresponding entity data and associated interaction data of a second time period; analyzing the change context data to determine atomic event data associated with the enterprise process based on detection of one or more of: a change in state of the one or more entities or a change in state of one or more interactions of the one or more entities included in the change context data; providing the atomic event data associated with the enterprise process as input to a trained machine learning model; determining, using the trained machine learned model and the atomic event data, a predicted future state of the enterprise process; and generating, based on the predicted future state of the enterprise process, an alert or recommendation. Other embodiments of this aspect include corresponding computer systems, apparatus, and computer programs recorded on one or more computer storage devices, each configured to perform the actions of the methods.

Implementations may include one or more of the following features. The system may include one or more data sinks associated with the enterprise process, and where the operations further include transmitting, the alert or recommendation to one or more data sinks associated with the enterprise process. The analyzing the change context data to determine event data may include: identifying change context data elements in the change context data that are associated with a particular entity; determining a subset of the change context data elements that are associated with a change in state of the particular entity; and classifying the subset of change context data elements as event data for the particular entity. Generating the alert or recommendation may include generating an alert or recommendation for the performance of an automated action within the enterprise process that is determined to optimize one or more parameters indicative of a state of the enterprise process. The system may include a delta storage database to store the change context data. Implementations of the described techniques may include hardware, a method or process, or computer software on a computer-accessible medium.

DETAILED DESCRIPTION

Figure 1A:
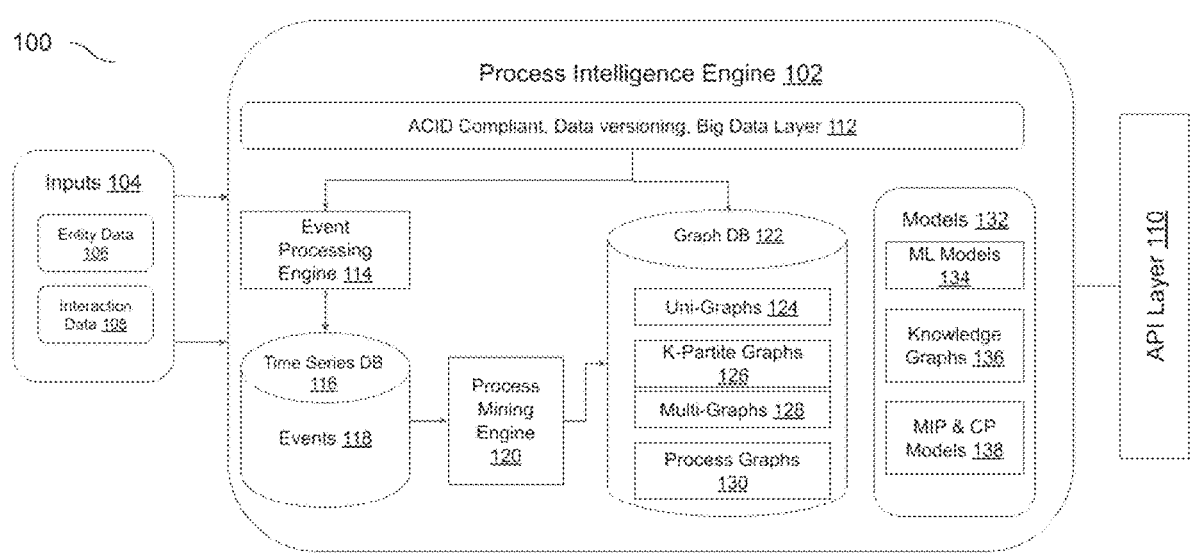
FIG. 1A is a diagram of an example system environment for process discovery and optimization, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

Some figures utilize similar (like) reference numerals to identify like elements. A letter after a reference numeral, such as "510," indicates that the text refers specifically to the element having that particular reference numeral. A reference numeral in the text without a following letter, such as "110," refers to any or all of the elements in the figures bearing that reference numeral (e.g. "110" in the text refers to reference numerals "510*a*," "510*b*," and/or "510*n*" in the figures).

A technical problem in enterprise computing is process discovery and optimization.

While capabilities may exist for building Artificial Intelligence (AI) tools to enhance some of these processes, today's toolsets (mainly supervised machine learning) commonly require an external entity defining the problems, making the problem suitable for reinforcement learning or supervised learning and for supervised learning problems created labeled data and for reinforcement learning requires creating the specification of a state of the enterprise process and value functions that measure this state and then identifies policies that will lead to the specified goal states.

This disclosure describes systems and methods for process discovery and optimization that span across the different organizational departments like Marketing, Sales, Logistics, and Finance.

Per techniques of this disclosure, event log data and other existing datasets that may be created and stored (also known as digital exhaust) are utilized to determine (discover) processes as practiced within the organization and implemented via the enterprise computing system. Concatenation of time series data with a graph database is utilized to extract a parameterized model that is represented in a graph database. The parameterized model may then be generalized and utilized in combination with machine learning (ML) techniques for predictive purposes, identifying aberrations between planned and practiced processes, generation of alerts, generation of recommendations, process optimization, etc.

A process intelligence engine is described herein that enables decision making to improve an enterprise process (end-to-end enterprise system). The decision making may be fully or partially automated and integrated into a process to make it self healing and/or provide decision support to a decision maker.

The intelligence engine determines three contextual components—Change, Process and Connections. Change context is derived by getting a state of the enterprise process and its properties at different snapshots in time, which in turn is utilized to derive change events in an automated fashion. A Process context is determined by building process maps from a filtered set of change events with an interacting entity, e.g., customer entity, product entity, batch entity, etc., that is common across all the events as the focus. A Connections context builds the connections of the interacting entity with other entities.

For example, most business enterprise processes have a customer as their principal entity and all business interactions can be modeled to revolve around the customer (namely identifying potential customers, selling a product/service, shipping the product/service, maintaining the product over its life cycle in order to generate the most value to the customer).

Change context: In order to determine a change context, a number of potential customers, number of sales, number of shipped orders are identified at repeated intervals to derive the change context data such as:

Customers Identified
Sales made to customers
Orders shipped to customers
Orders returned from customers
Product replaced under warranty for a customer
Product upgraded after end of life for a customer When the same change context data is captured at repeated intervals, one can get the actual customers who were identified during the interval, the sales made during that interval etc.

Process Context: Using the customer as the principal entity, one can derive the customer journeys through the process and also create process metrics on the delays between each state transition as well as the overall throughput of the process.

Connections context: While process context deals with the temporal state changes, each customer may be part of a different segment, products/services they purchase may be for a different product category and the usage patterns may be different for different customers causing the process to have a normal set of variations. Connections context allows for filtering the process to identify the variations that matter when everything else is kept constant.

Alerts and recommendations are based on determinations of a future enterprise process state, e.g., a decision may be made based on anticipation of a future interaction event or set of events. Business interactions, due to the heavy digitization are happening in the digital realm as opposed to the physical realm. Learning from the past interaction behavior to predict the future interaction events/event sets is better handled by digitized bots as opposed to a human.

A foundation layer is described herein that can enable machine agents, e.g., bots to learn and anticipate future interaction events/event sets in a specialized fashion for different types of decisions.

This learning capability is enhanced by combining the advances in deep neural networks and Bayesian learning techniques through constant belief updation. The learning capability includes learning the joint probability distribution of the various enterprise process parameters/attributes, e.g., sales, as they relate to entities, e.g. customers, and entity interactions/activities, e.g., views, clicks, cart additions, reviews etc.

FIG. 1A—Architecture

FIG. 1A is a diagram of an example system environment for process discovery and optimization, in accordance with some implementations.

The system environment 100 (also referred to as "system" herein) includes a variety of computer systems associated with a particular enterprise process. Each of the subsystems can include a set of networked computers and devices. User system 100 can also include other subsystems not depicted, as they may pertain to the particular enterprise.

FIG. 1A illustrates a block diagram of an environment 100 for process discovery and optimization. Environment 100 may include a process intelligence engine 102, input systems 104, and an API layer 110 utilized to interact with external systems.

The process intelligence engine may include an ACID compliant, Data Versioning and Big Data Layer 112. In other implementations, environment 100 may not have all of the components listed and/or may have other elements instead of, or in addition to, those listed above.

The big data layer provides the capability to identify granular events, even when they are in billions or trillions giving the capability to build a process map, even for extremely complex processes executed in a multitude of systems, each capturing different sets of interactions.

System 100 may include any machine, system, or set of machines, systems that are used by an enterprise. For example, any of systems 100 can include handheld computing devices, mobile devices, servers, cloud computing devices, laptop computers, work stations, and/or a network of computing devices.

The process intelligence engine may further include an event processing engine 114 and a process mining engine 120, which are communicatively coupled to a time series database 116 and a graph database 122.

The time series database and graph database may utilize captive storage and/or cloud based storage. In some implementations, on-demand database services may be utilized. The data store may include information from one or more tenants stored into tables of a common database image to form a multi-tenant database system (MTS). A database image may include multiple database objects. A relational database management system (RDMS) or the equivalent may execute storage and retrieval of information against the database object(s).

In some implementations, a data lake, e.g., delta lake storage may be utilized to realize one or more of the databases described herein.

In some implementations, an open source object oriented database may be utilized that is configured for unlimited database size. A max table size of about 32 TB, about 64 TB, or about 128 TB may be supported. The database can support JSON and XML storage along with primitive, structured and composite data types, and enables table partitioning, advanced indexing, parallelization and nested transactions.

In some implementations, the database supports PL/PGSQL, Python, stored procedures, function, and data wrappers, along with support for international characters and full text search.

The graph database may be utilized to store different graphs and process maps, e.g., uni-graphs 124, K-partite graphs 126, Multi-graphs 128, and process graphs 130.

The process intelligence engine further includes models 132, e.g., Machine learning models 134, Knowledge graphs 136, and MIP and CP models 138.

The graph database enables making connections between different data sources giving the flexibility to model relationships when one exists and not having them if none exists. The graph database also enables creating multiple labels for a single node such as customer, B2B customer, VIP customer etc., all referring to the same customer and giving access to systems all of this information in milliseconds without the need for linking multiple tables as in a traditional SQL database. Different entities within the process, their meta-data and how they interact with other entities can be modeled into a k-partite graph or a general purpose multi-graph.

An application execution environment is provided to support execution of one or more software application(s) within the process intelligence engine. For example, an application execution environment may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based off Linux CGroups, Docker, CoreOS, or the like), a process executing under an operating system (e.g., a UNIX process), etc. In some implementations, the application execution environment may be a software application, e.g., that is configured to execute on server hardware.

Figure 1B:
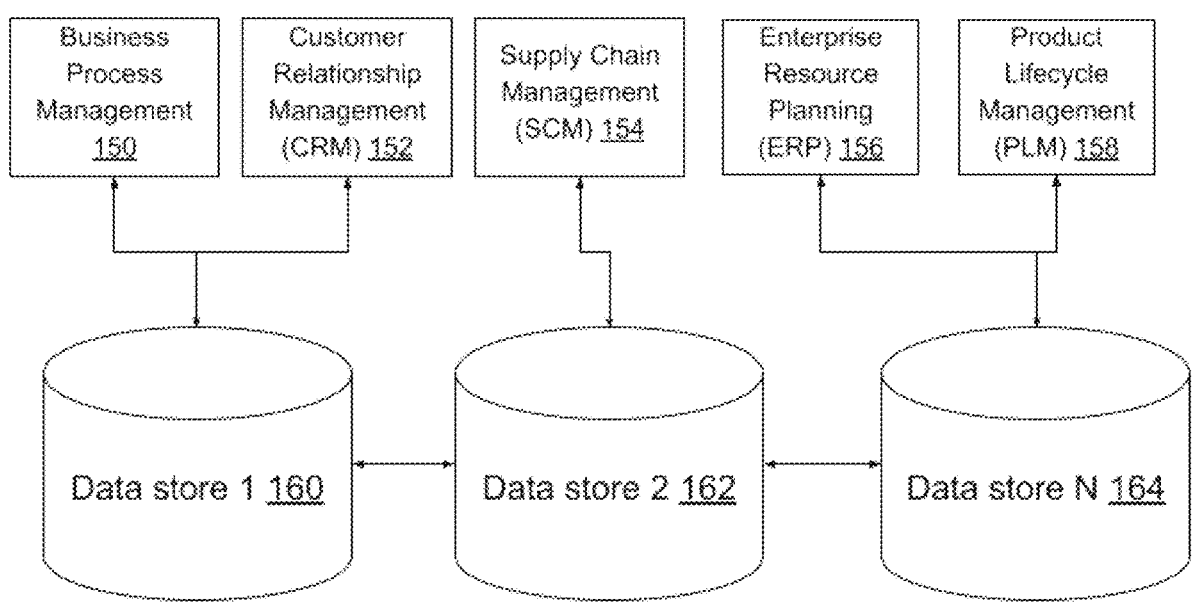
FIG. 1B is a diagram that depicts example computing systems that interact in an enterprise process, in accordance with some implementations.

FIG. 1B—Different Systems

FIG. 1B is a diagram that depicts example computing systems that interact in an enterprise process, in accordance with some implementations.

As enterprises grow, complexities increase in their operations. As depicted in FIG. 1B, an organization that operates in multiple geographical regions and offers for sale to customers a wide range of products and services can utilize a variety of subsystems for the management of transaction and customer data across the organization.

For example, an organization may operate a business process management subsystem (150) across its showrooms and retail locations which captures transaction data that relates to its retail customers. The business process subsystem can include a network of devices that are used to record the products or services included in a customer transaction, calculate one or more taxes due on the transaction, generate a transaction total, accept payment, generate a receipt, and create a record of the transaction. In some implementations, the business process management systems can include software components, hardware components, and a payment processor component.

A customer relationship management (CRM) subsystem (152) may be utilized by the organization for management of prospective and/or current customers. Some organizations may implement an Enterprise Resource Management (ERP) subsystem (156) which includes multiple computing devices and processes for the gathering, consolidation, and organization of business data through an integrated software suite. In some implementations, the ERP subsystem includes software applications for the automation of business functions like production, sales quoting, accounting, etc.

A supply chain management (SCM) subsystem 154 may be utilized by the enterprise process to regulate its supply chain and network with multiple suppliers. A product lifecycle management (PLM) subsystem 158 may be utilized for managing product lifecycles.

As can be seen, a complex business can lead to many siloed subsystems, and a comprehensive process analysis can only be performed when data from the multiple subsystems are collectively analyzed, rather than within the respective siloes.

Figure 1C:
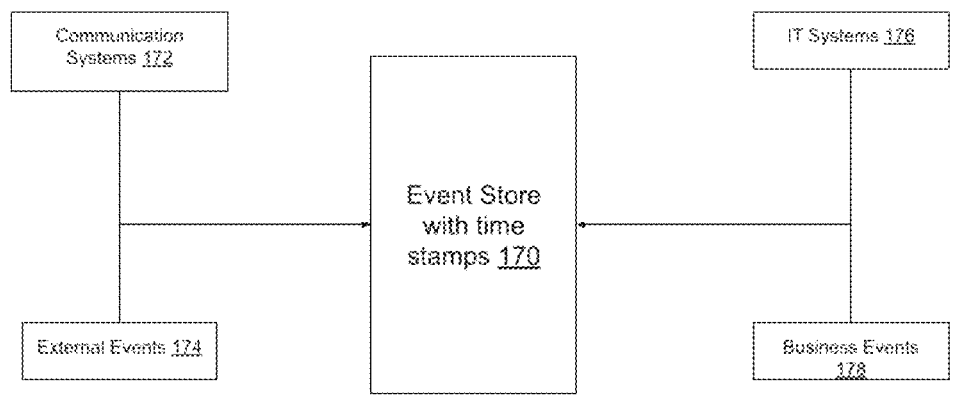
FIG. 1C depicts an example event store and interacting computer systems, in accordance with some implementations.

FIG. 1C—Event Store Etc

FIG. 1C depicts an example event store and interacting computer systems, in accordance with some implementations.

An event store 170 may be utilized to store event data across the enterprise process. Events could be transactions taking place between various entities in the IT systems in the organization like ERP/CRM systems. Each of these transactions and the entities involved may have a state that may change (transition) based and each state change along with the timestamp is stored as an event.

Event data may be received from one or more subsystems or sub-processes of the enterprise process such as Communication systems 172, External Events 174, IT systems 176, and Business Events 178.

Events could also be interactions between individuals or groups (virtual conferences, group chats in slack, google chat, etc., email and the creation and update of documents in a collaborative environment)

Events could also be external events such as a new law taking into effect, knowledge of a new law that will take effect sometime in the future, that have an impact on parameters associated with the state of the enterprise process.

Events could also be Business events such as acquisitions, mergers, re-organizations, and other major decisions.

Figure 2A:
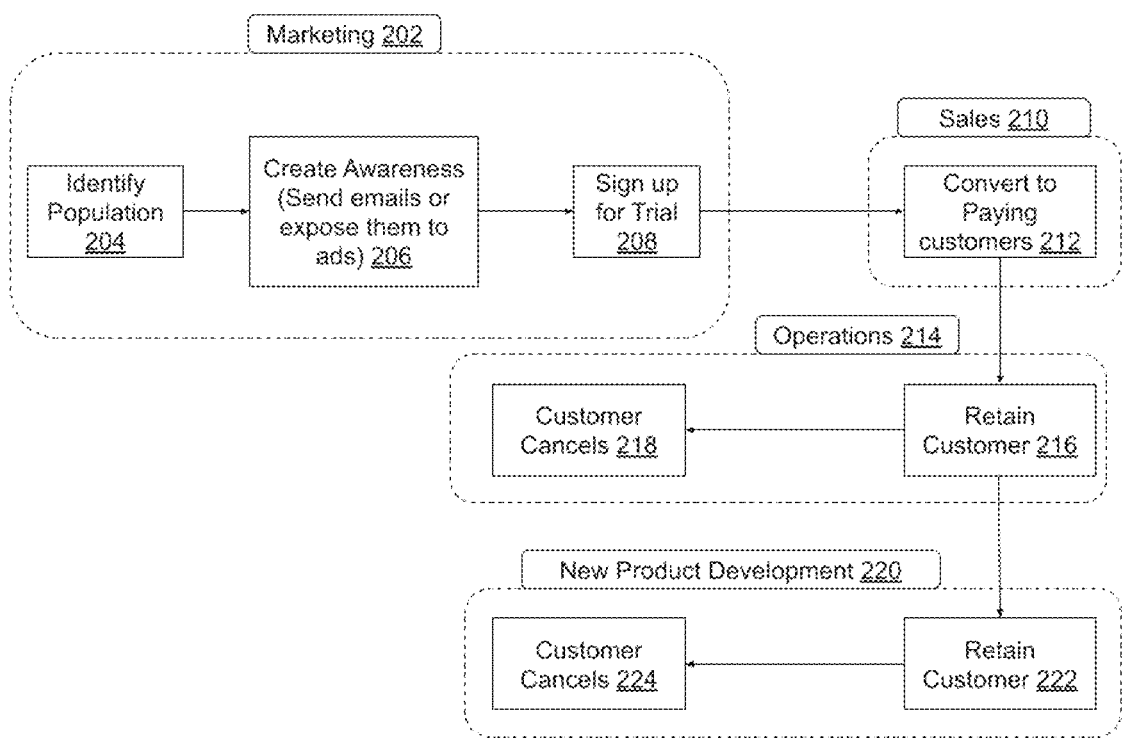
FIG. 2A illustrates an example business enterprise process, in accordance with some implementations.

FIG. 2A—Example Business Enterprise Process

FIG. 2A illustrates an example business enterprise process, in accordance with some implementations.

As depicted in FIG. 2A, a business enterprise process can include multiple sub-processes that cover activities starting from a marketing campaign for a product or service and going all the way to booking revenue for the product or service.

An example business enterprise may be a company that makes digital widgets (images, movies, books etc) and makes money by providing access to these digital widgets. The access provisioning is a promise that the company is making to its customers. If the company can fulfill its promise effectively then the company retains customers in the short term it is due to the efficiency of the promised delivery (Operations) and if it continually improves the promise itself then it retains customers in the long term (New Product Development). Failure on any of these dimensions will cause the company to fail either in the short term or in the longer term, and having a synthetic agent that looks at the overall system efficiency can be an effective safeguard for the company.

The company's entire value delivery process can be broken down into the following process:
Creating and Improving its Promise Offering (Product Development)
Creating awareness and generating interest towards its promise offering (Marketing)
Converting interested prospects into customers (Sales)
Delivering the promise effectively (Operations)

In this illustrative example for a subscription based product, e.g., a digital media subscription, the business process includes a marketing 202 function, a sales 210 function, operations 214 function, and a new product development 220 function.

A process journey for a typical entity, e.g., a customer, may include the entity interacting with one or more of the functions. For example, the marketing function may be associated with the identification of a customer population 204, awareness creation 206, and facilitating customer trials 208.

The sales function may be responsible for converting 212 trial customers to paying customers. An operations function is associated with customer retention in the short-term, and based on a customer's product/service experience, the customer may be retained 218, or may cancel 220 their subscription.

In the long run, however, the new product development function may be critical to customer retention. Again, the customer may be retained 222, or may cancel 224 their subscription.

An overall throughput for the business enterprise, e.g., revenue and/or profit, is associated with the optimization of the collective sub-processes, rather than on any individual sub-process, even though all the sub-processes are important to the customer journey.

While individual sub-process performance may still be evaluated based on metrics computed at the sub-process level, e.g., marketing may be evaluated by a number of trial sign-ups, an overall throughput may not be ensured automatically, e.g., many of the customer sign-ups may not convert to paying customers.

Digital enterprises operate with a very high degree of automation. Multiple systems (ERP, CRM, CPQ, Billing etc) are utilized to monitor a enterprise, each of which is a silo by itself, allowing for the business to achieve a local optima (a CRM system can claim to make the lead management process most efficient, as would the CPQ making the quoting process most efficient). However for the overall business to improve they need to strive to improve the global optima, which would mean improving the throughput of the bottleneck sub-system to its optimum level until a bottleneck emerges in another sub-system, which would shift the focus to the other subsystem.

Figure 2B:
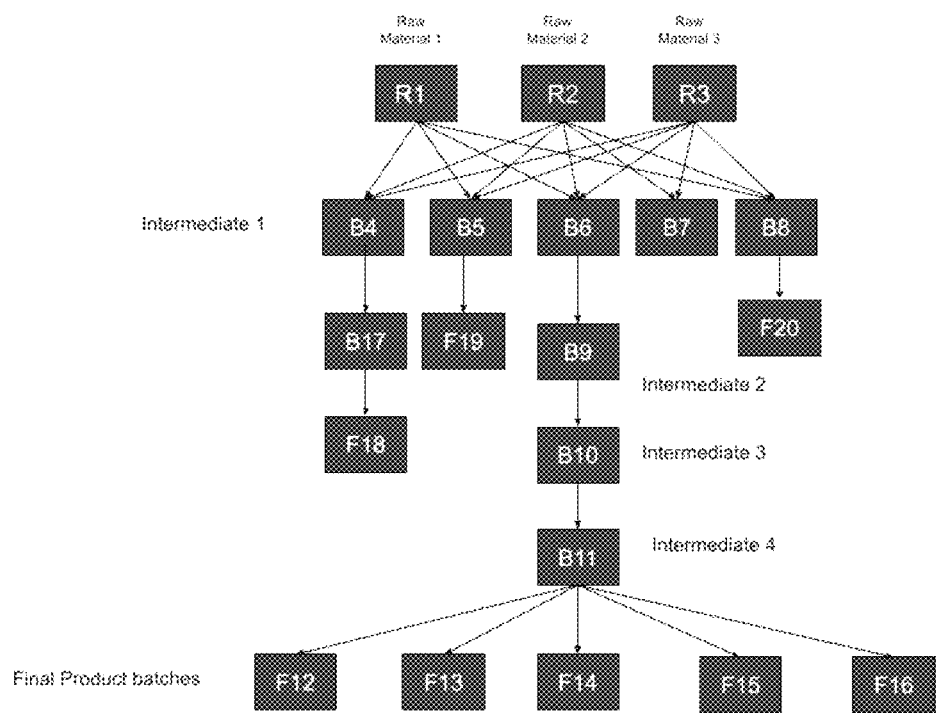
FIG. 2B illustrates an example pharmaceutical manufacturing enterprise process, in accordance with some implementations.

FIG. 2B—Example Pharmaceutical Manufacturing Enterprise Process

FIG. 2B illustrates an example pharmaceutical manufacturing enterprise process, in accordance with some implementations.

Pharmaceutical companies procure and manufacture their products and intermediaries in batches. Throughput is important and quality issues in the batches can not only impact productivity but also lives. Multiple batches can be combined to produce several batches and issues even in a single batch can cause problems in the downstream batches and the final product batch that is provided to the customer. In this case a defective batch is an anomaly and identifying all the batches that can have impact is shown in the diagram below.

In this illustrative example, three different raw materials (R1, R2, and R3) are combined to form several intermediary batches (B4 through B11 and B17) which are then transformed into different stages of intermediate batches and finally result in a set of final product batches F12 through F16, and F18 through F20. A quality issue with even one of the raw material batches can result in a lower quality product for all batches that were an output from the batches B4 through B8. However if the issue was more of a process problem while manufacturing B6 then only the B6 batch would have an issue and the quality issues would propagate to the final batches B12 thru B16 and when testing one of these batches B14.

Figure 3:
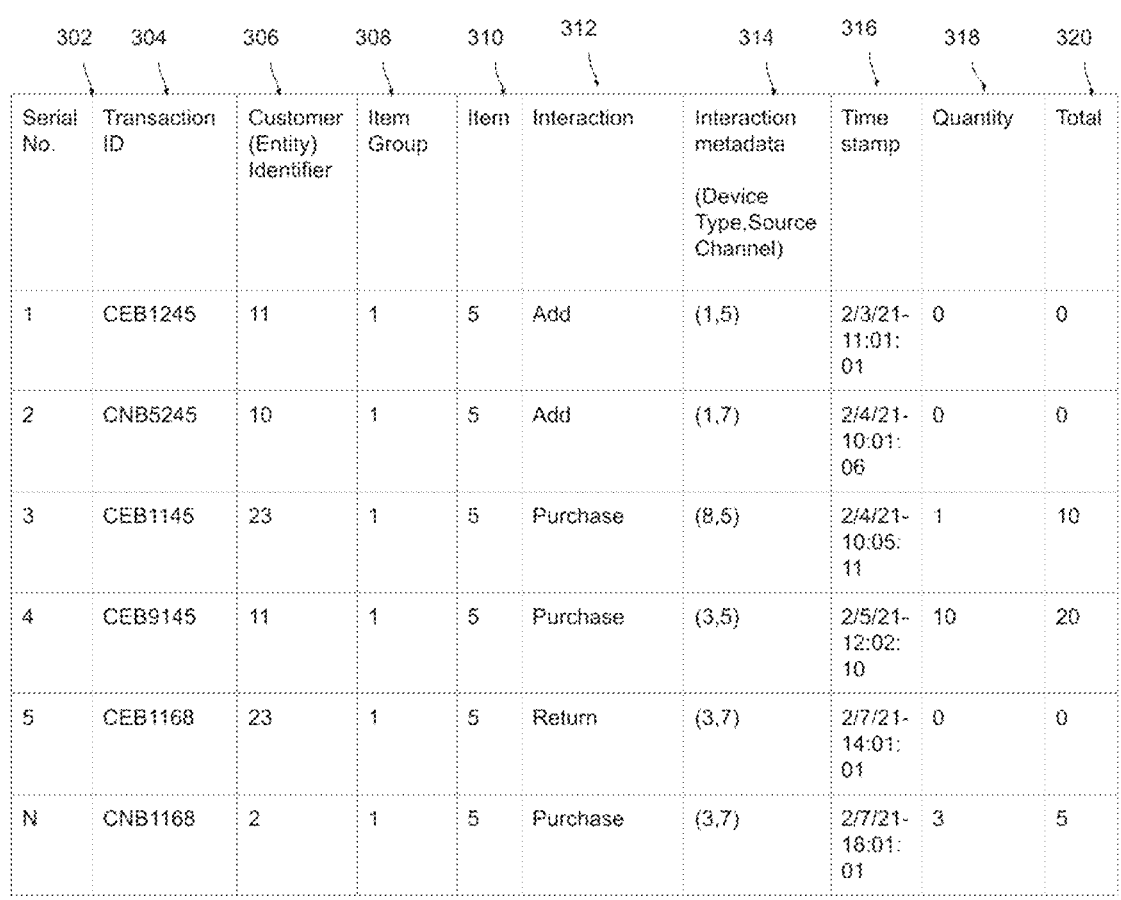
FIG. 3 depicts an example activity log, in accordance with some implementations.

FIG. 3—Example Activity Log

FIG. 3 depicts an example activity log 300, in accordance with some implementations.

The activity log may be received from any of multiple subsystems and sub-processes within the enterprise process, e.g., subsystems 150, 152, 154, 156, or 158 described with reference to FIG. 1B and/or from subsystems and events 172, 174, 176, and 178 described with reference to FIG. 1C.

In some implementations, an activity log includes records associated with a particular subsystem/sub-process, whereas in other implementations, an activity log may include records associated with different subsystems/sub-processes.

In this illustrative example, the activity log is depicted as a table; other structures may be utilized to store activity log data. In some implementations, an activity log may be derived from unstructured data, eg., chat transcripts, social media feeds, etc., and some pre-processing may be performed to store the data in a structured manner.

As depicted in FIG. 3, an activity log may include multiple records, and various attributes associated with each record. In this illustrative example, the activity log includes a serial number 302, a transaction identifier 304, an entity identifier 306, an item group identifier 308, an item identifier 310, an interaction (activity) description 312, interaction metadata 314, a time stamp 316, a quantity 318, and a total 320.

It will be appreciated that based on the specific application/implementations, an activity log may have a variety of formats that include different attributes/fields. Even within a single enterprise process, an activity log associated with each sub-process of the enterprise process may include a set of attributes that differ from sets of attributes included in activity logs of other sub-processes.

For example, an activity log derived from a CRM system may have detailed information about the entity (customer) and entity metadata, e.g., type of device, whether at time of interaction (activity), location, etc., whereas an activity log derived from a social media feed may only include information about an identity of the entity (customer), and an indicator of a customer mood.

An entity identifier, e.g., customer identifier, product identifier, etc., serves as a guiding entity to link one or more activity logs.

An activity log can originate from any subsystem or set of transactional systems that can push (or be pulled by) their events to an activity logger. An API may be provided to enable the publishing of the logs for a given system or set of systems.

The activity/interaction logs will persist the interactions within the system or set of systems in a time series database as an event log. The advantage of this loose coupling is to enable integration with any number of systems by just allowing these systems to push interesting events that signify an entity's interaction within the system.

In some implementations, each interaction includes a label that specify the interaction entity and the state of the interaction. For example, order interactions could be booking, back-ordered, fulfilled, shipped, invoiced, paid where an additional interaction identifier would be the invoice identifier and possibly identifiers such as credit memos and payment identifiers. Other associations of the entity such as customer identifier, customer category identifier could also be useful in building perspective maps of multiple perspectives. Time-series databases, e.g., Prometheus, influxDB, etc., may be utilized to store millions of time series events per second and enable the time-series database to be horizontally scalable.

Figure 4:
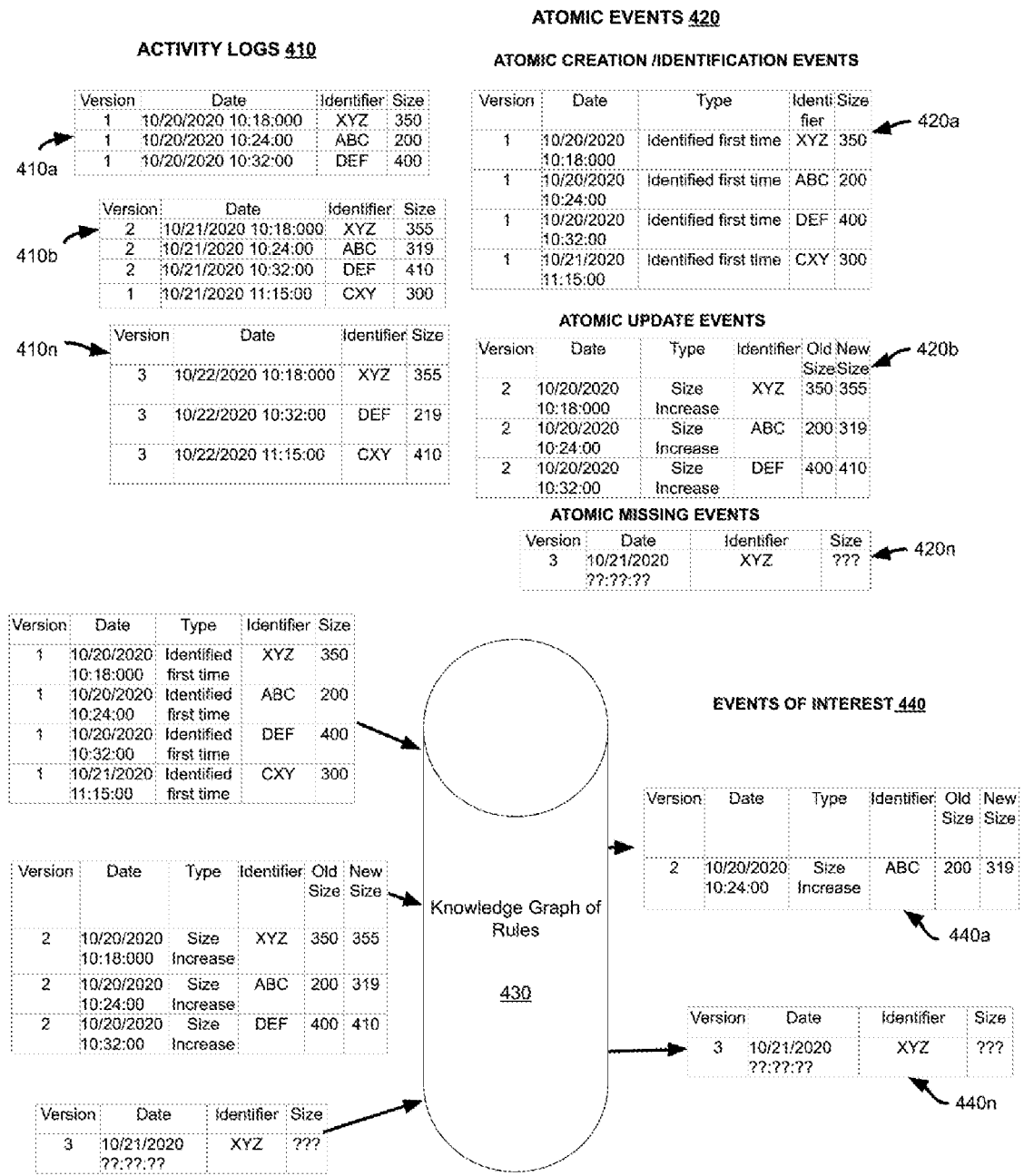
FIG. 4 illustrates the generation of change context data and atomic event data from activity logs, in accordance with some implementations.

FIG. 4—Change Context and Atomic Event Data

FIG. 4 illustrates the generation of change context data and atomic event data from activity logs, in accordance with some implementations.

Generation of change context data and atomic event data from activity logs can provide additional information about entities, their intents, and behavior. The activity logs also include information about decisions and actions that may be invisible to the enterprise process. For example, the fact that a user has comprehended an email sent to the user by the enterprise process may be inferred from an observed actions whereby the user clicks on the link in the email followed by further clicks resulting in adding something to a shopping cart, and eventually clicking another link to purchase a product. This set of actions is related to an observable change in state for the enterprise process, which is an increase in an attribute associated with the enterprise process state-namely, a Total Volume of sales in Dollars.

Atomic events are determined based on detected changes to states of entities or interactions of the entities included in one or more activity logs.

FIG. 4 depicts activity logs 410 that include specific activity logs 410a, 410b, and 410n. Each of the activity logs includes a version of the activity log, a timestamp (data of time) of a respective activity/interaction, an entity identifier, and a size associated with the interaction.

In some implementations, a list of all known entities is obtained at a given time point t along with corresponding interactions for a historical period, e.g., from a current time to a previous time. Subsequently, incremental interactions and entity lists are obtained from all the respective subsystems and subprocesses. The incremental data may be obtained for the same or different time intervals. Time stamp data included in the activity log may be utilized to suitably order the interactions.

Atomic events are identified based on application of rules that classify events based on a type and extent of change of a state of an entity or its interaction state. Change context data is determined for each entity based on a comparison of activity log data for different time periods. Predetermined thresholds may be utilized to detect when a change context meets a threshold that is significant to be considered as signal, rather than as noise. A change context signal is received when the difference meets pre-existing rules; when the change context does not meet these rules, it is considered noise. The signal determination can be made on raw activity data or some processed data, e.g., such that the signal/noise determination rule could be operated on the mean of the changes computed over N changes.

In this illustrative example, atomic events 420 are identified based on application of rules specified for the enterprise process. The rules may be configurable, and may also be automatically adjustable based on a detection volume of atomic events.

Atomic creation/identification events 420a, atomic update events 420b, and atomic missing events 420n are identified based on change context data determined for various entities included in the activity logs.

In some implementations, a knowledge graph of rules 430 may be utilized to further identify events of interest 440. In this illustrative example, the knowledge graph of rules is applied to identified atomic events 420a, 420b, and 420n to further identify events of interest, and events of interest 440a and 440n are identified. For example, atomic missing event 420n associated with entity "XYZ" is identified as an event of interest 440n, while, from a list of events in the atomic update events 420b, only the size increase associated with entity "ABC" is identified as an event of interest 440a, while the size increases associated with entities "XYZ" and "DEF" is not included as events of interest.

Events of interest identification may enable a reduction in dimension of observed events and may enable faster model training and determination of alerts and recommendations.

Atomic events identification may include the following:
  New entity in the entity list and an interaction for the entity which leads to two atomic events (new entity and new interaction)
  New interaction for an existing entity seen in the historical time period which will create a single atomic event (new interaction)
  No interaction seen for an existing entity in the historical time period for a given set of time intervals (entity removal)
  An entity may have undergone metadata changes in an updated list obtained at a given time period.

Every entity list and interaction will have metadata or extra data and this extra data or meta-data could be used to identify interesting events.

An example is provided below:
E-Commerce Enterprise Process
  On Jan. 1, 2021 an organization XYZ gives us a list of entities (100K Customers, 5K Items) along with a set of interaction types (View, Click, Add, Purchase, Remove, Review etc) that occurred between the entity sets for the past 1 year.
  The organization also supplies the different interaction types at the following intervals:

Views/Clicks/Adds—Every minute (along with any new item or customer entity information such as ip address and some interaction meta data such as time spent etc.)
  Purchases/Returns—Every hour (along with the item, customer entity information along with other interaction data such as payment type, card hash etc)
  Reviews—Every day (along with the item, customer entity information and some interaction data namely the text of the review.)
  New customers (possibly unidentified customers) performing views are tagged with a new identifier and added to an atomic event list. (new entity and new interaction)
  Existing customers that return and view a product are also added to an atomic event list (new interaction)
  On Dec. 31, 2021 it is observed that 4000 of the customers haven't been observed performing any activity within the enterprise process for the entire year. A corresponding atomic event is triggered (entity removal).

Figure 5A:
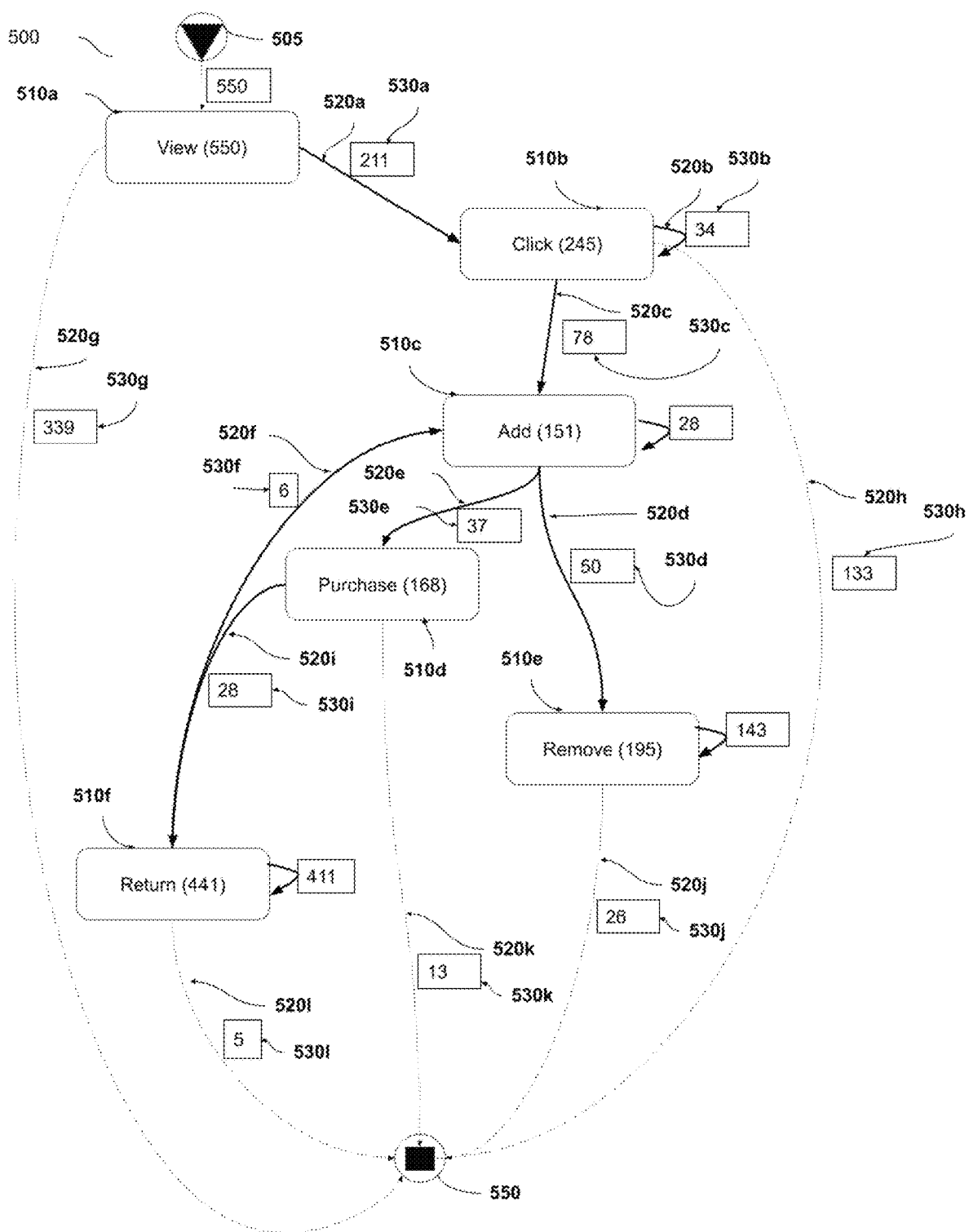
FIG. 5A illustrates an example process map generated from activity logs, in accordance with some implementations.

FIG. 5A illustrates an example process map generated from activity logs, in accordance with some implementations.

Based on activity logs and inferred event data, process maps may be created for the enterprise process.

One or more event log(s) and a set of provided core process abstractions generate process maps are generated using these abstractions. Similar abstractions are identified based on combinatorial techniques to generate process maps that may be larger than even the event log data set. Building a rich family of process maps with various perspectives can enable the enterprise process system to identify which process maps present the best way to optimize invariant process metrics that do not change with the process maps. These process maps are stored along with their rates that will essentially permit the recreation of the process under different conditions to learn the relationship between the internal activity rates and delay rates with the overall process rates.

In this illustrative example, a process map 500 is depicted with starting node 505 and an end node 550. Intermediate nodes 510 represent various identified states of entities (from the activity logs and event data), while edges 520 represent process steps that enable a transition of an entity from one state to another. Each node includes a count/frequency that the node was visited, and each edge includes a count/frequency that the edge was traversed.

As depicted in FIG. 5A, based on multiple activity logs (similar to activity log 300 described with reference to FIG. 3) and inferred event data (using a method similar to methods described in FIG. 4), events of interest, viz., view a product 510a, click on a product link 510b, add a product to a shopping cart 510c, purchase 510d, remove a product 510e, and return product 510f are identified and depicted as a process map/graph.

In this manner, the enterprise process can be represented as a graph and stored and made operational using graph-databases, e.g., graph database 122 described with reference to FIG. 1A. The entire enterprise may be represented as a collection of graphs, some of which are connected to other graphs.

The process map represents a complex sequence of activities performed/reperformed in a specific ordered manner until the result is something more than the simple aggregation of those activities/interactions. The sequence of these activities, the time lag between these activities and the time taken for each of these activities are key to the efficiency and effectiveness of the enterprise process. The effectiveness of an enterprise process is determined by measuring one or more outcomes of the process and what it produces. The efficiency of a process is determined by judging how little time or resources were spent in producing a satisfactory outcome (keeping the outcome relatively constant). These rates can be with respect to time or with respect to other variables such as resources, capital, customer-satisfaction. Given this model, it is possible that the overall performance of the system can be optimized by adjusting statistics about these processes such as increasing revenue/quarter, reducing time-to-market, reducing production time and increasing yield.

The process rates could be classified into rates that need to be increased and the rates that the system would like to decrease. In essence, the state of the system movement is favorable when all the rates that need to be increased are maximized and all the rates that need to be decreased are minimized. The enterprise process state may be measured by two sets of rates, a set of maximization rates, and a set of minimization rates. For example, in this illustrative example, a purchase rate associated with the purchase state 510d may be a maximization rate, whereas a return rate associated with the return state 510f may be a minimization rate.

The state changes of the enterprise process/system may be controlled by an agent to tune the system by moving the system into a more favorable state(s), and thereby improving the performance/throughput of the system.

The process discovery map may be converted into a set of more granular rates that result in the overall system rate. The revenue production process can be described by a set of activities that are performed and for many companies is described by the Interest to Cash process.

Perspective Mapper

Perspectives are different views of the process. One view of the process may be at the entity level, another view of the process may be at the associated entity level, another view of the process may be only entities associated with a certain set of timestamps (such as certain times of the day, or during weekends, during weekdays, during holidays, etc), or have certain attribute values (such as having order value greater than x, less than x, quantity ordered >y, etc). The perspective mapper helps business users provide their own perspectives on how they view the business. For some businesses, the weekday sales may be important, while for some businesses the holiday sales may be more important and impactful. By specifying the perspective in terms of different attributes, timestamp filters, and aggregations, the system can learn how to define a perspective in a combinatorial fashion using similar attributes, timestamp filters, and aggregations. The perspective of a process may change if we introduce the context of who performed an activity, and their training level or experience and its impact on the outcome.

Examples of Perspectives

A perspective is one way to look at a process. For example, a service ticket flow can be a process where each individual service ticket goes through a series of states before being closed. However instead of looking at the service tickets as the entities flowing through the process, one can look at the customer associated with the service ticket as the case, and we can see how the customer endures different state changes. A different abstraction could be a set of service tickets that represent a type or class and then using these as the flow. The roles of the resources handling these service tickets could be considered as the steps the service ticket class takes thereby giving an organizational view of how different service ticket classes are handled. Other ways of abstracting the activities may also be possible whereby one could add the resource class (by the level of training) to see how a particular training intervention has improved the process outcome.

In the case of healthcare, the diagnostic activity can be conducted by a general physician, physician assistant, nurse practitioner and they could be done with the support or without the support of various diagnostic aids.

While activities and cases are shown here to have some kind of hierarchical structure, a much richer perspective becomes available when sub-graphs (a pattern of the entity journeys are all combined into an activity itself). For example one may want to only look at cases that originated on a weekend, are a particular type and are associated with a particular resource or resource group.

Figure 5B:
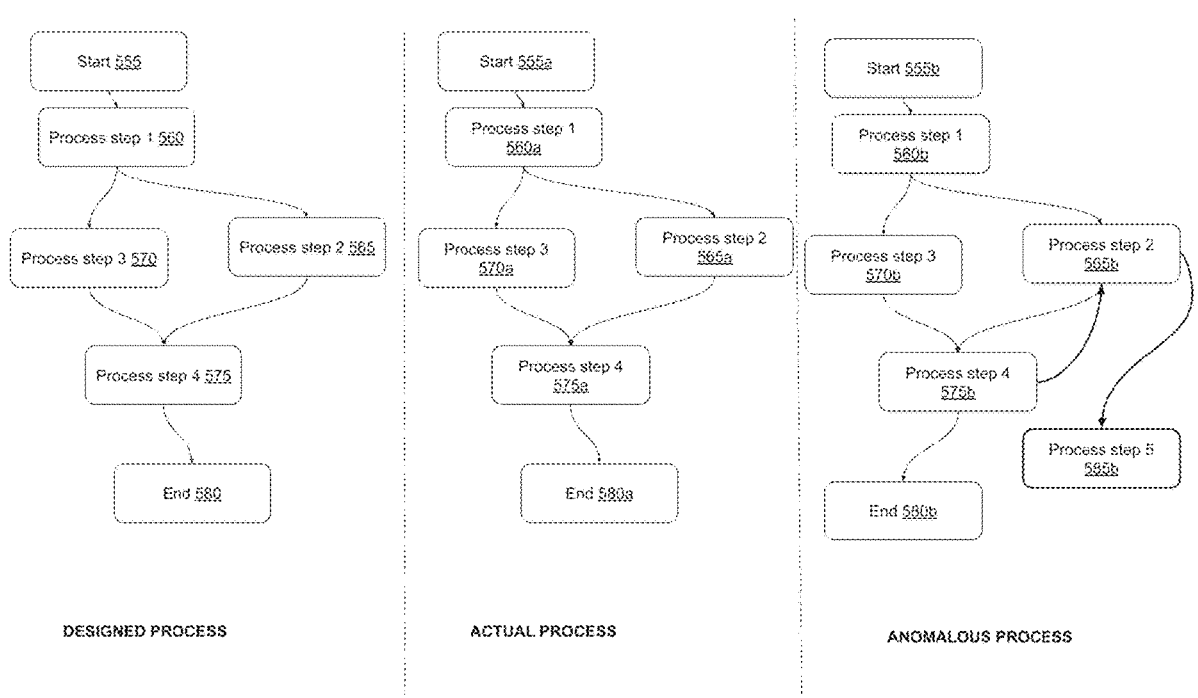
FIG. 5B depicts an example of an anomalous process map, in accordance with some implementations.

FIG. 5B depicts an example of an anomalous process map, in accordance with some implementations.

Based on process discovery from event-log data by AI ProcessTuner, a process map may be generated that may be compared to a nominal path which the business may consider as typical or standard. For example, in FIG. 5B, a nominal designed process map represented by process steps 555 through 580 is compared to an actual discovered process map represented by process steps 555a through 580a. Based on similarities, it may be concluded, in this illustrative example, that the process is working as designed.

However, another discovered process map represented by process steps 555b through 585b may indicate an alternative process path where there are additional delays or deviations from the baseline path. For example, there are entities that traverse a process edge from process step 4 575b back to process step 2 565b which is not included in the designed process, as well as additional process step 5 585b, which does not terminate. Detection of anomalous process maps may enable detection of inefficiencies, fraud, etc.

Problem templates may be identified and flagged based on a process map.

Presence of Loops: Within the process, if the same activity gets repeated for several cases after another activity, a loop in the graph is detected that may be indicative of a bottleneck in the process.

Presence of an activity repeated at least 'n' times': When there is a loop in a process graph, one can unwind the loop and have an activity for each instance and its repetition. The problem template is thus the sub-graph of when the activity and the nth repetition is Large waiting times—Subgraphs where the waiting times are above a certain percentile.

Presence of a specific pattern—If a specific subgraph is considered an anomaly based on previous patterns, the specific pattern may be identified and flagged.

Figure 6A:
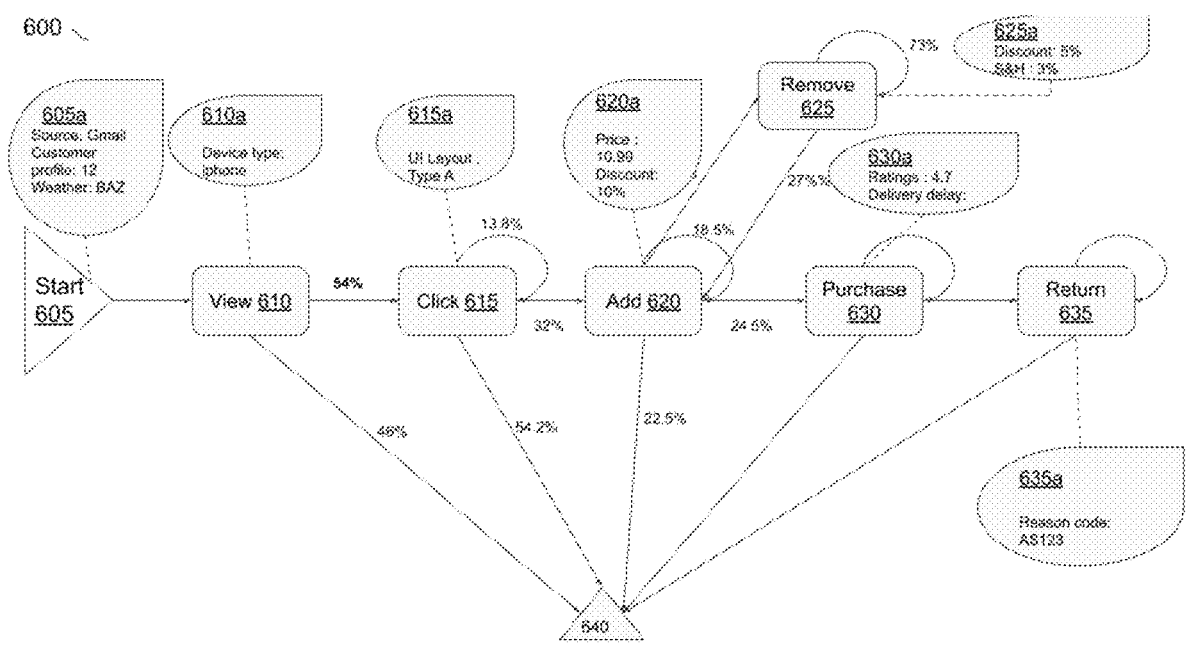
FIG. 6A illustrates an example state transition model, in accordance with some implementations.

FIG. 6A illustrates an example state transition model 600, in accordance with some implementations.

A state transition model may be determined based on the activity logs and event data that includes state transition probabilities for each state identified in a process graph/map.

The state transition probabilities for each state are determined based on a respective frequency of realization of a state, and may be conditioned on entity metadata and interaction metadata.

In this illustrative example, a state transition model for an e-commerce enterprise process journey is depicted. The model includes a start state 605 and a sink (end) state 640, with intermediate states representing a view 610, click 615, add 620, remove 625, purchase 630, return 635.

Each state is also associated with corresponding metadata. For example, the start state may include metadata 605a that may include data about a source channel for the transaction (e.g., Gmail, print ad, Facebook link, etc.), a customer profile, ambient weather at a customer location at a time of the transaction, etc.

A view state may be associated with view metadata 610a, a click state with click metadata 615a, an add state 620 with add metadata 620a, a remove state with remove metadata 625a, a purchase state with purchase metadata 630a, and a return state with return metadata 635a.

As depicted, the metadata for a state includes data that may include insights into reasons for the state change, e.g., high shipping costs for removal of a product from a cart, good reviews for a purchase, a particular user interface (UI) layout for a click, etc.

Entity data and corresponding entity metadata and interaction metadata is obtained for multiple entities and interactions across activity logs and event logs and aggregated to determine the state transition probabilities and the state transition model for an enterprise process.

The state transition model and probabilities may be continually updated as more interactions and activity logs are received.

Figure 6B:
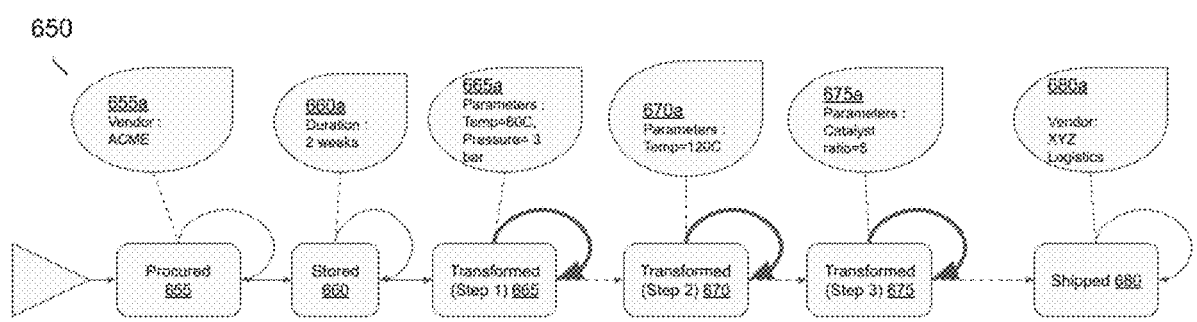
FIG. 6B illustrates an example state transition model, in accordance with some implementations.

FIG. 6B illustrates an example state transition model, in accordance with some implementations.

The state transition model may also be determined for a manufacturing process, e.g., a pharmaceutical manufacturing enterprise process. The activity logs may include activity logs from information technology (IT) systems as well as sensor data from sensors installed in equipment and other infrastructure utilized in the manufacturing process. The state transition model is thereby enriched by "invisible" variables such as plant operating conditions that may have an effect on product quality, durability, etc.

In this illustrative example of a manufacture of a particular product, the state transition model includes a procurement state 655, a storage state 660, a first transformation (intermediary manufacture) 665, a second transformation 670, a third transformation 675, and a shipped state 680.

Corresponding metadata associated with the states is also included in the state transition model.

The state transition model and the process intelligence engine can enable a manufacturing head of a pharmaceutical company who wants to improve the overall efficiency of their manufacturing by taking action on problem batches upstream in the manufacturing chain before it becomes a problem in the final quality of batches that are supplied to the customer. This is done by providing the end to end visibility of every batch, its complaints, test results, and the ability to create machine learning models that can relate the earlier batches in the manufacturing, their testing results, the manufacturing parameters that transform these batches into further batches downstream finally resulting in the final drug batch supplied to the consumer.

In a pharmaceutical efficacy setting, adverse reactions of batches of products in the trial process may be linked to specific manufacturing variations. This is done by providing the end to end manufacturing visibility of a drug batch with the treatment results of actual patients who have seen successful results and adverse outcomes and providing the ability to build machine learning models that can use the intermediate batch quality parameters, manufacturing parameters for producing each batch and the active pharmaceutical ingredient potencies of each final batch along with the ability to track even minor variations of the process in practice with the process on record.

Figure 7A:
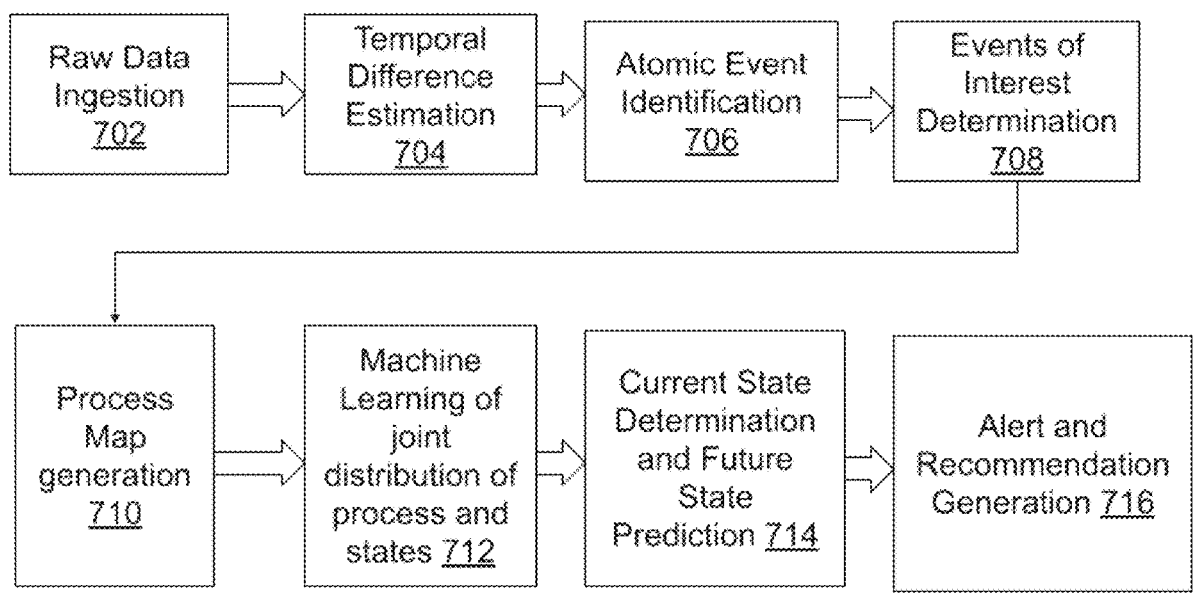
FIG. 7A is a block diagram illustrating an example method to generate an alert or recommendation based on received raw data, in accordance with some implementations.

FIG. 7A is a block diagram illustrating an example method to generate an alert or recommendation based on received raw data, in accordance with some implementations.

The method may commence at block 702 with raw data ingestion. The raw data ingestion may include diverse datasets, e.g., logs, ERP, CRM, planning system data, email, speech to text transcripts from conference calls, chat messages IVIES, etc. The raw data may include data associated with a variety of interactions, e.g., Web data/browsing data (time spent, clicks etc), review data, sales data, etc. Block 702 may be followed by block 704.

At block 704, a temporal difference estimation may be performed for states of various entities and their interactions to determine delta datasets. The temporal difference estimation may be performed over different timescales, e.g., seconds, minutes, hours, days, weeks, months, etc. Different entities and variables may utilize different sampling periods. For example, customer views may utilize a first sampling period, whereas customer purchases may utilize a second sampling period. Block 704 may be followed by block 706.

At block 706, atomic event identification may be performed based on the delta datasets by filtering the delta datasets based on provided enterprise rules and to reduce data dimensionality, increase signal fidelity, etc. Range based filtering, and data-type and rule-based vetting may be utilized to perform atomic event identification.

In some implementations, a time-series database may be utilized to store event logs. The time series events generated by various sub-processes may be utilized to create a set of complex enriched events that may be an aggregation and/or a transformation of multiple events put together that occurred during different granular time intervals. Block 706 may be followed by block 708.

At block 708, events of interest may be identified based on specified rules. Predetermined thresholds may be utilized to filter only a select number of events of interest that may be more crucial to enterprise state parameters. Block 708 may be followed by block 710.

At block 710, one or more process maps and state transition probabilities may be generated for the enterprise process. Petri-net graphs may be utilized to visualize the process maps and display one or more process graphs to a user via a user interface. Block 710 may be followed by block 712.

At block 712, a joint multi-variate distribution of the process, its states, and interactions is learned based on the state transition probabilities. A mixture of distributions and corresponding weight may be determined based on testing multiple likely distributions. A distribution that minimizes an error function may be selected. Block 712 may be followed by block 714.

At block 714, a current state is determined, and a predicted future state of the enterprise process is determined based on a machine learning model. Block 714 may be followed by block 716.

At block 716, one or more alerts and recommendations may be generated based on the predicted future state of the enterprise process. The alerts and recommendations may be generated corresponding to entities, irrespective of their state, that when implemented may maximize an enterprise process level reward.

The method may be performed by an automated agent (digital bot) to optimize the process to maximize a system throughput or other specified parameters.

As an example, a product A may have sales that are learned as a Poisson distribution with a mean of 40 units per day. This Poisson distribution is dependent on the Product A view distribution which is a normal distribution with a mean of 500 views per day with a Bernoulli distribution of the views coming from two classes of customers with one class having a proportion of 65%, with the other class contributing to the remainder views.

A first decision recommendation would be to ensure that there are 400 units in stock to cater to the sales for a period of 10 days, where a lead time for a new order fulfillment for the product A being 4 days.

Newly arriving activity log data is utilized to verify that fundamental assumptions of the dependent distributions are still aligned and to update the model about the distribution if the data indicates variations on the actual observed data when compared to the model.

As an example, if in the past two periods of interest (e.g., weeks/days/months) of sales data fits a Poisson distribution of 45 units per day and the view distribution has increased to a mean view of 650 units per day, and there were five stockout periods that happened in the last two periods as opposed to the expected two stock out periods, a recommendation may be triggered to increase safety stock to 450 units if the lead time remains the same, or adjust accordingly.

Figure 7B:
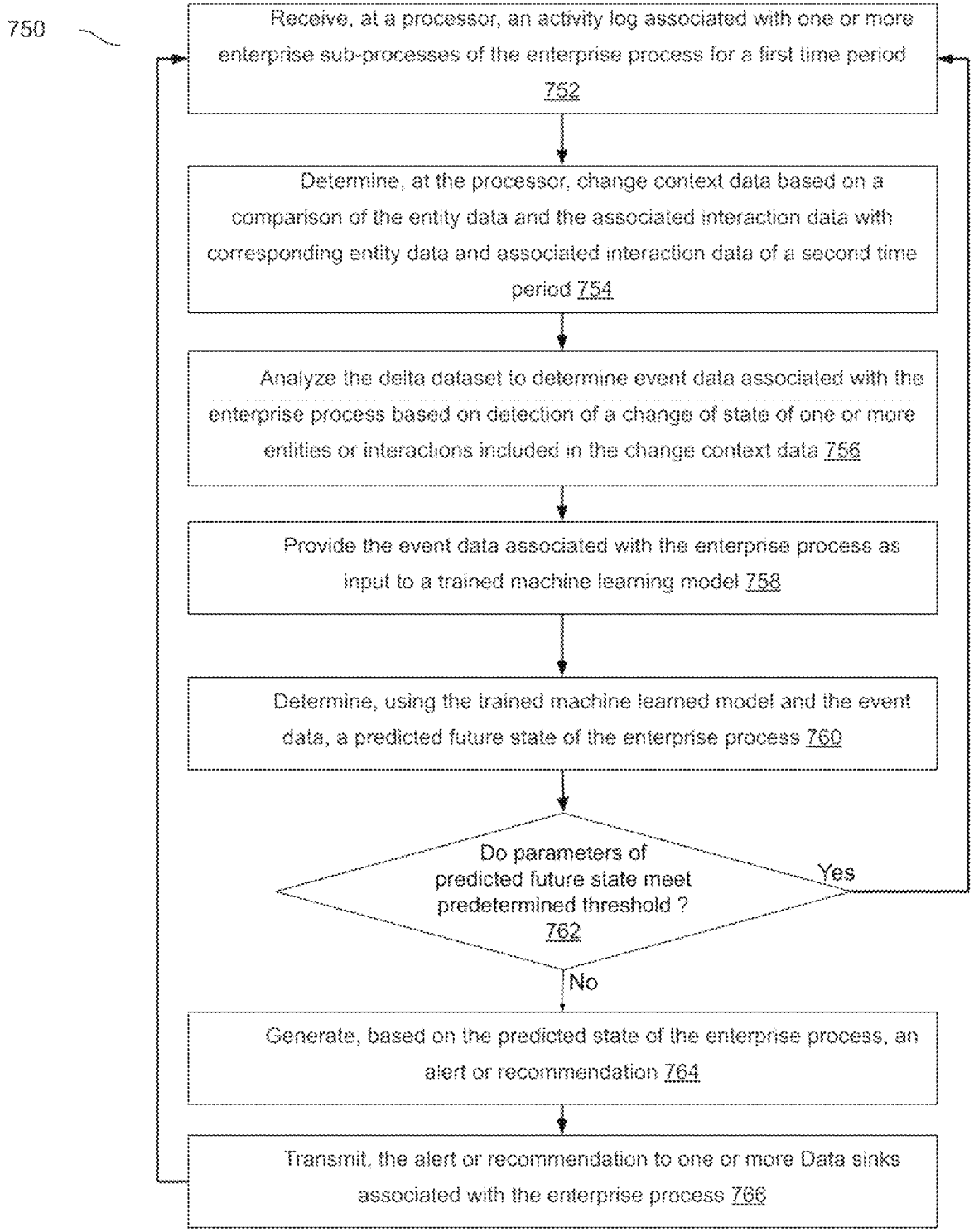
FIG. 7B is a flowchart illustrating an example method to generate an alert or recommendation based on an activity log, in accordance with some implementations.

FIG. 7B is a flowchart illustrating an example method 750 to generate an alert or recommendation based on an activity log, in accordance with some implementations.

In some implementations, method 750 can be implemented, for example, in the process intelligence engine 102 described with reference to FIG. 1. In described examples, the implementing system includes one or more digital processors or processing circuitry ("processors"), and one or more storage devices (e.g., a datastore 118 or other storage). In some implementations, different components of one or more servers and/or clients can perform different blocks or other parts of the method 750. In some examples, a first device is described as performing blocks of method 750. Some implementations can have one or more blocks of method 750 performed by one or more other devices (e.g., other client devices or server devices) that can send results or data to the first device.

Method 750 may begin at block 752. At block 752, receiving, at a processor, an activity log associated with one or more enterprise sub-processes of the enterprise process for a first time period, wherein the activity log includes entity data of one or more entities and associated interaction data of the one or more entities.

The activity log may be received as multiple activity logs or as one aggregated activity log that includes data regarding interactions between various entities. The activity logs may be generated at different computer systems associated with the enterprise process and may include activity logs created from information technology (IT) systems. Entity data and metadata may be generated from multiple sources, e.g., emails, speech to text, customer interaction transcripts, etc.

In some implementations, the enterprise process may be a digital process, and the activity log may include structured and unstructured data from one or more enterprise computer systems.

In some implementations, the enterprise process may be a combination of a digital process and a manufacturing process, and the activity log may additionally include sensor data from one or more sensors installed in equipment and/or other infrastructure utilized in the manufacturing process.

In some implementations, the activity log data is stored as time series data that can provide an ability to look at the rate of increase and decrease of customers, rate of addition and removal of items, rate of interaction addition, etc.

In some implementations, the activity log may be pulled by a processor, e.g., pulled by a processor associated with the process intelligence engine. The activity log data may be received as streaming data and/or as batch data.

Block 752 may be followed by block 754.

At block 754, determining, at the processor, change context data based on a comparison of the entity data and the associated interaction data with corresponding entity data and associated interaction data of a second time period. Block 754 may be followed by block 756.

At block 756, analyzing the change context data to determine atomic event data associated with the enterprise process based on detection of one or more of: a change in state of the one or more entities or a change in state of one or more interactions of the one or more entities included in the change context data.

In some implementations, analyzing the change context data to determine atomic event data may include identifying change context data elements in the change context data that are associated with a particular entity, determining a subset of the change context data elements that are associated with a change in state of the particular entity or interactions associated with the particular entity, and classifying the subset of change context data elements as an atomic event for the particular entity.

In some implementations, determining atomic event data may include applying one or more filters. The filtering techniques may utilize thresholds to determine atomic event data and for noise removal. In some implementations, classifiers may be utilized to determine atomic event data. In some implementations, determination of atomic event data may include an aggregation of repeated interactions recorded for one or more entities.

In some implementations, the event data may further include event interaction data and aggregated interaction paths of one or more entities.

In some implementations, a process map may be generated based on the event data. Based on the event data, one or more entities included in the event data are identified. For each of the one or more entities, the received event data is ordered based on timestamps included in the event data. A frequency of occurrence of one or more events in the event data for the respective entity is determined. The ordered event data and the corresponding frequency of occurrence are aggregated across all entities to generate the process map based on the aggregated ordered event data and the frequency of occurrence.

In some implementations, a determined process map may be compared to a reference process map to determine instances of fraud, inefficiencies, etc. A reference process map for the enterprise process is obtained. The determined process map is compared to the reference process map to determine a deviation. If it is determined that the deviation meets a threshold deviation, a fraud alert may be generated based on a determination that the deviation meets a threshold deviation.

In some implementations, a state transition model for the enterprise process may be generated by identifying one or more states of a plurality of entities included in the atomic event data, determining a frequency of occurrence of a respective state transition between the one or more states for each of the plurality of entities, and determining a combined state transition probability for each of the states based on aggregating the respective state transitions across the plurality of entities.

In some implementations, conditional state transition probabilities for each of the one or more states conditioned on entity metadata associated with each of the one or more states are determined. Conditional state transition probabilities provide additional insights to key factors that may influence the enterprise process state and provide levers that can be utilized to tune the enterprise process towards optimality.

In some implementations, multivariate joint distribution parameters of the states of the entities may be learned using a deep neural network.

Block 756 may be followed by block 758.

At block 758, providing the atomic event data associated with the enterprise process as input to a trained machine learning model.

The machine learning (ML) model may be trained prior to its utilization based on training data. In some implementations, providing as input to the machine learning model, data that includes one or more training activity logs and realized states of the enterprise process corresponding to the training activity logs are provided as input to the machine learning model.

One or more predicted states of the enterprise process are generated by the ML model. The one or more predicted states are compared with respective realized states of the enterprise process and one or more parameters of the machine learning model may be adjusted based on the comparison.

Block 758 may be followed by block 760.

At block 760, determining, using the trained machine learned model and the atomic event data, a predicted future state of the enterprise process.

In some implementations, the predicted future state is determined by simulating a predicted future state of the enterprise process based on a current state of the enterprise process and the state transition model for the enterprise process, and traversing multiple paths in the enterprise process to determine possible outcomes, and to select a future state with the highest likelihood of realization as the predicted future state.

In some implementations, a joint probability distribution of one or more parameters indicative of a state of the enterprise process is determined based on one of more states of the plurality of entities and one or more interaction states (e.g., as it compares to the views, clicks, cart additions, reviews, etc.) of the plurality of entities.

Block 760 may be followed by block 762.

At block 762, one or more parameters associated with the future predicted state are compared to predetermined thresholds.

If it is determined that the one or more parameters associated with the future predicted state meet predetermined thresholds, e.g., lie within expected ranges, block 762 may be followed by block 752.

If it is determined that the one or more parameters associated with the future predicted state do not meet predetermined thresholds, block 762 may be followed by block 764.

In some implementations, one or more parameters corresponding to the predicted future state of the enterprise process are obtained and compared to corresponding predetermined threshold values for the one or more parameters. An alert or recommendation may be generated based on any one of the one or more parameters not meeting the predetermined threshold values.

For example, it may be determined that one or more parameters associated with the future predicted state are indicative of a lower revenue, shipping bottlenecks, etc.

It may also be determined, based on the current state of the enterprise process, a current state of one or more entities and associated metadata, and the future predicted state, that the performance of certain recommended actions may lead to even more improved outcomes.

At block 764, generating, based on the predicted future state of the enterprise process, an alert or recommendation. Block 764 may be followed by block 766.

In some implementations, an action recommendation for an entity may be generated based on a particular conditional state transition probability of a state of the entity and a determination that performing the action recommendation is associated with a preferred predicted future state of the enterprise process.

In some implementations, the alert or recommendation may be a general alert or recommendation transmitted across computing devices and/or databases associated with the enterprise process. In some implementations, the alert or recommendation may be a targeted alert or recommendation that is transmitted to a suitable sub-process where the alert or recommendation may be implemented. In some implementations, the alert or recommendation may be automatically implemented by a bot and/or automated agent associated with the enterprise process.

For example, if it is determined, based on the state transition model and a current state of one or more entities (e.g., a threshold number of customers viewing a particular product) that offering a discount on the particular product is likely to lead to a threshold increase in purchases of the item, and a higher revenue, a recommendation may be made to offer the discount, and a bot or agent may implement the recommendation by updating the product views to reflect the discounted offer without any additional human intervention.

In some implementations, an alert may be generated directly from the event data itself. Patterns of sequences of event data that are received may be compared to a trained distribution to detect an anomaly (unexpected good/bad outliers) alert that is likely to affect system throughput.

In some implementations, the alert may include a sub-graph associated with a detected or predicted state (or states) and may further include metadata of one or more states that triggered the alert.

In some implementations, a time-scale associated with a predicted anomalous state may be utilized to determine the nature of a generated alert. Enterprise process conditions that may require urgent intervention, e.g., serious financial fraud, may be triggered with a priority level indicator associated with a suitable level of urgency.

At block 766, the alert or recommendation may be transmitted to one or more data sinks associated with the enterprise process.

The data sinks can include other IT systems, databases, email communication systems, etc. that are configured to receive alerts, triggers, forecasts, reports, probabilistic process models, recommendations, etc. These outputs may be transmitted to user devices associated with various decision-makers, process owners, planners, and oversight personnel in the business.

Action Learning & Action Triggers

In some implementations, interaction metadata may be utilized to trigger actions and/or recommendations. Action triggers may be triggered as Detection, Classification, Recommendation, or Forecast alerts.

In some implementations, fraud detection and detection of entity anomalies and system anomalies may trigger a detection alert.

Classification alerts may be generated for example, based on, identification of customers who are suitable for a promotion or for providing a referral code for future purchases.

Recommendation alerts may include recommending a price for a given item, recommending a price and discount combination for a given item or set of items.

Forecast alerts may be generated that forecast a rate of purchases for a given product for a future time period to be utilized in planning or for other analytics purposes.

Policy Learning

The engine learns the policies that provide the most benefit. Policy is defined by a series of actions.

P1=A11, B11, C11, D11, E11, resulting in a Reward R1
P2=A12, B12, C12, D12, E12, resulting in a Reward R2

The agent learns the policy automatically regardless of the domain by learning the process as a Markov Decision process (MDP) and then associating each state with an action and the associated transition probability associated with the action.

Learning the policy means learning the sequence of actions that are most likely to maximize the total reward of the process.

Method 750, or portions thereof, may be repeated any number of times using additional inputs. In some implementations, the predicted states of the enterprise process may be generated at a predetermined frequency, e.g. daily, weekly, etc. In some implementations, method 750 may be triggered by alerts received by one or more computing systems.

Figure 8:
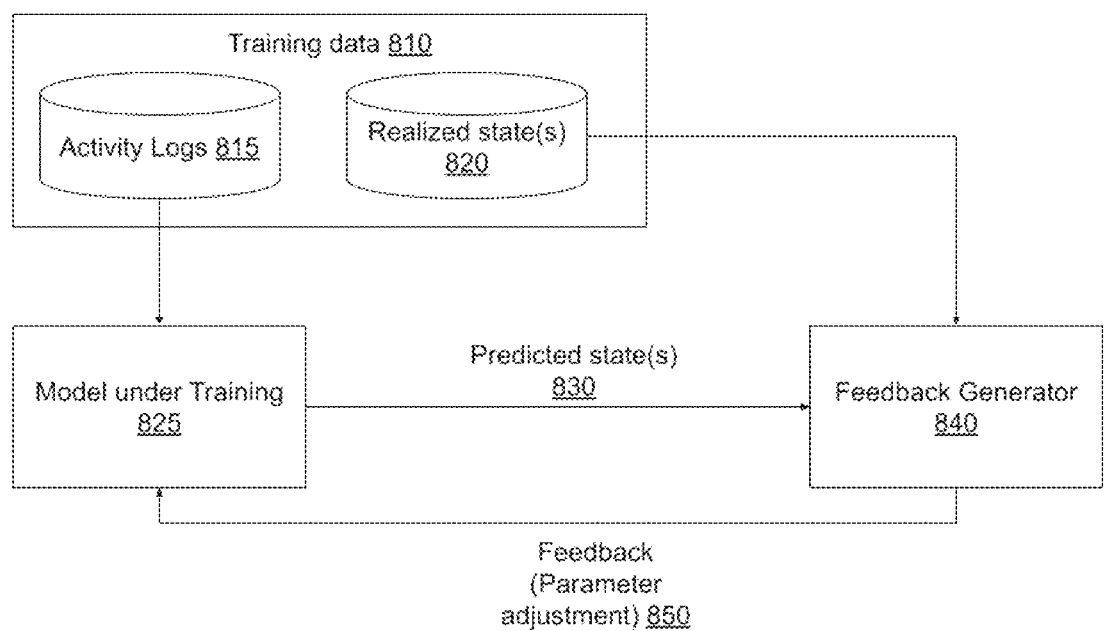
FIG. 8 is a block diagram illustrating an example of supervised machine learning (ML) to generate an alert or recommendation based on an activity log, in accordance with some implementations.

FIG. 8 is a block diagram illustrating an example of supervised machine learning (ML) to generate an alert or recommendation based on an activity log, in accordance with some implementations.

The supervised learning can be implemented on a computer that includes one or more processors and memory with software instructions. In some implementations, the one or more processors may include one or more of a general purpose central processing unit (CPU), a graphics processing unit (GPU), a machine-learning processor, an application-specific integrated circuit (ASIC), a field-programmable gate array (FPGA), or any other type of processor.

In this illustrative example, supervised learning is used to train a machine learning (ML) model 825 based on training data 810 and a feedback generator 840. ML model 825 may be implemented using any suitable machine learning technique, e.g., a deep neural network, a feedforward neural network, a convolutional neural network, or any other suitable type of neural network. In some implementations, other machine learning techniques such as Bayesian models, support vector machines, hidden Markov models (HMIs), etc. can also be used to implement ML model 825.

Multiple types of machine learning techniques may be combined. For example, unsupervised learning techniques may be utilized to learn the overall joint-probability distribution and their associated parameter values; networks developed using supervised learning may be utilized to predict next steps, predict anomalies, or generate triggers based on the current state of the system and real-time operational data. Reinforcement learning may be utilized for system-wide optimization where a policy (e.g., set of actions undertaken along with its set of parameters and meta-data) is reinforced or penalized based on the outcome of executing a policy and its alignment with a cost (or reward) metric.

The training data 810 includes activity logs 815 and realized states 820 for the enterprise process based on previous history. The activity logs may include any activity logs, interaction data logs, and/or event logs, e.g., those described with respect to FIGS. 3 and 4. The realized states may include various parameters and attributes associated with the enterprise process that may be obtained from one or more computing systems associated with the enterprise process.

In this illustrative example, activity logs 815 are provided to a machine learning (ML) model under training 825. The ML model generates a set of predicted states 820 based on a current state of the ML model and the activity logs. For example, the ML model may determine a feature vector (or embedding) based on features of activity logs 815. The feature vector (or embedding) may be a mathematical, multi-dimensional representation generated based on the activity logs 815. Different states of an enterprise process may have different feature vectors, based on respective states corresponding to the activity logs.

The predicted states 830 generated by ML model 825 are provided to feedback generator 840.

Feedback generator 840 is also provided with the realized states 820 corresponding to the enterprise process. Feedback 850 is generated by feedback generator 840 based on a comparison of the predicted states with the realized states. For example, the loss value is utilized to adjust one or more parameters of the ML model. For example, when the ML model is implemented using a neural network, the weight associated with one or more nodes of the neural network and/or a connection between one or more pairs of nodes of the neural network may be adjusted based on the loss value. In some implementations, a weight associated with a link between a pair of nodes of the neural network may be adjusted.

For example, if predicted states 830 are similar to realized states 820, positive feedback may be provided as feedback 850, while if the states are dissimilar negative feedback is provided to the ML model under training, which may be updated based on the received feedback using reinforcement learning techniques.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

In some implementations, the activity logs are all processed simultaneously by a single ML model. In some implementations, a particular type of activity logs, e.g., those generated by a ERP or CRM system, are processed by a first ML model, while another subset of activity logs, e.g., transcripts of social network chats, may be processed by a second ML model, yet another subset of activity logs may be processed by a third ML model, etc.

In some implementations, different types of ML models may be utilized to process different categories of activity logs and identify particular characteristics in each category of activity logs. The identified characteristics may then be processed by a different ML model that operates on these intermediate outputs as its inputs to generate the predicted states.

The training of the ML model may be performed periodically at specified intervals, or be triggered by events.

In some implementations, the activity logs may be preprocessed prior to being provided to the ML model. For example, in some implementations, the activity logs may be filtered before being provided to the ML model.

Different types of learning models may be applied.

Supervised ML Models

Process maps could be converted to a vector by using a graph neighborhood to vector conversion, and then use a supervised learning model to evaluate under what conditions the process performs well. To do this we could split the process into two or more classes with one class representing superior performance and the other process representing inferior performance. The supervised ML model could then identify what activities/delays are responsible for a process with superior performance and thus build predictive capabilities that would suggest an intervention in terms of altering an activity rate. The supervised ML models are useful in tuning the system for short term improvements of the system state.

Reinforced Learning Models

Processes are dynamic and in several cases the rates that are used to represent the system are interdependent. By improving one rate, one can cause a detrimental impact on the others. For example reducing the Cash burn rate, can also significantly reduce the R&D investment rate which may have an impact over longer time horizons. By using a reinforcement learning model, the process could be played out far into the future to identify the impacts of the short term interventions suggested by the Supervised Learning Models and dampen the supervised learning model recommendations and act as a balance between short term system improvements with the longer term system improvements.

Probabilistic Inference Models

In processes that are subject to regulation, or are extremely rule based, a human interpretable probabilistic inference model could be built from the process maps which then could be improved through human input. This way the process intelligence engine may also benefit from human intelligence and a mediated understanding of the context of events which may not be captured in the digital exhaust.

Figure 9:
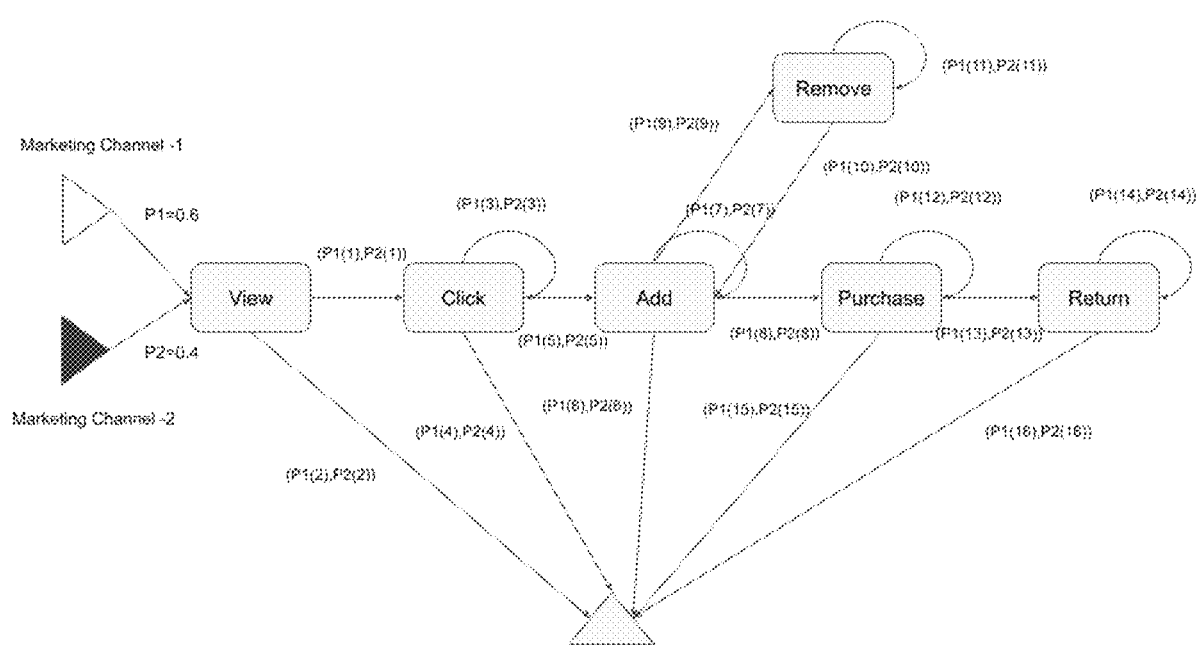
FIG. 9 depicts a conditionally segmented state transition model, in accordance with some implementations.

FIG. 9 depicts an example conditionally segmented state transition model, in accordance with some implementations.

A conditionally segmented state transition model that is conditioned on entity attributes, metadata attributes etc. offers additional capability to further tune an enterprise process. In this illustrative example, the conditionally segmented state transition model is conditioned upon an entry marketing channel into the enterprise process.

For example, an entity (customer) at a customer view state enters that state with a probability of P1=0.6 (60% probability) that they arrived via Marketing channel-1, and a probability of P2=0.4 (40% probability) that they arrived via Marketing channel-2. The P1 and P2 probabilities may be derived from previously received activity logs and corresponding event data.

Based on previously received data, downstream state transition probabilities (P1(i), P2(i)) may be determined for each state (i), e.g., click, add, purchase, remove, return, etc.

Per techniques of this disclosure, alerts and/or recommendations may be generated based on the conditional state transition probability of states that are associated with desired enterprise outcomes.

For example, if Marketing Channel-1 leads to a higher number of customer views when compared to Marketing Channel-2, but a conditional state transition probability (P1(12),P2(12)) for a purchase state is indicative of higher total purchases (also, when returns are considered) when the customer arrives via Marketing Channel-2, a recommendation may be made to boost an advertising spend in Marketing Channel-2, even though a preliminary view indicates lower customer arrival via Marketing Channel-2.

Figure 10:
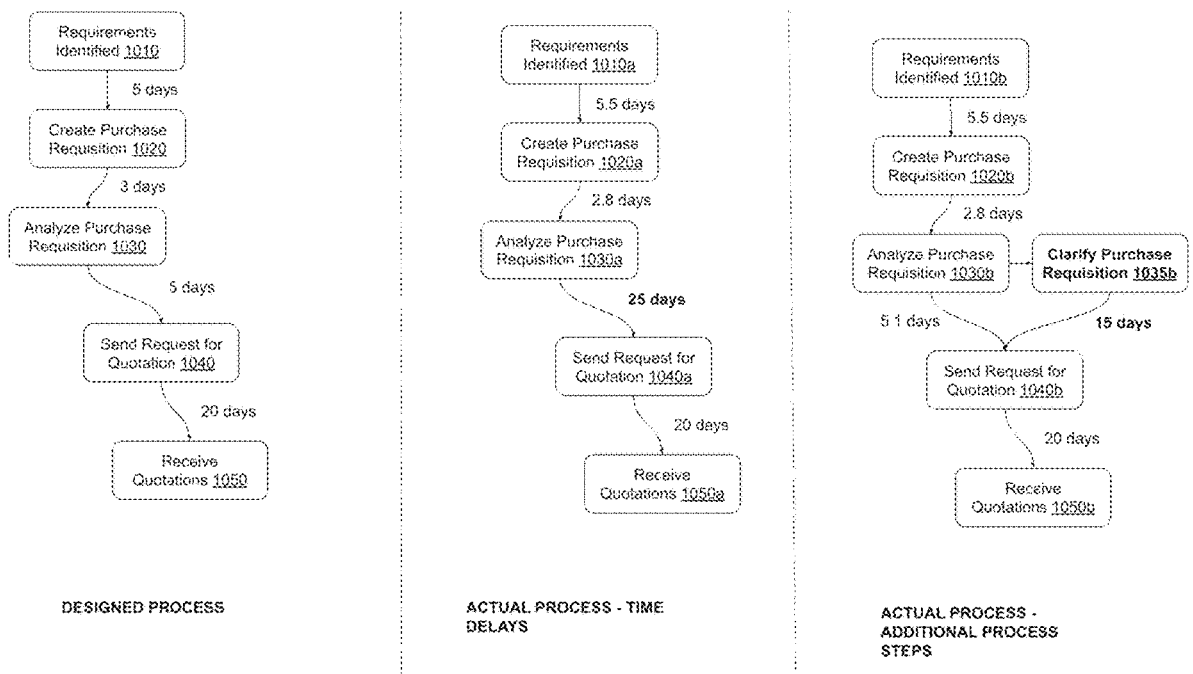
FIG. 10 depicts process discovery, in accordance with some implementations.

FIG. 10 depicts process discovery, in accordance with some implementations.

As described earlier, a discovered process can be computed to a plan of record (POR) to determine deviations, etc. While a POR process is commonly static, a deviation can arise because the process path encountered includes 'new' or 'meta' states that are not specified in the original POR. This is indicative of the process evolving over time and may be indicative of fraud or incorrect modeling of the process.

In some cases, it may be observed that the throughput transition from one state to the next state is different from an original POR transition assumption; this may be indicative of inadequate resource deployment, other bottlenecks, inefficiency, etc.

In some cases, it may be observed that the time elapsed between transitions from state to state differ significantly compared to a design transition.

In some cases, it may be observed that certain activities may be present in frequency (volumes) that are deviant from a plan. For example, a social network feed activity log may be indicative of high advertising and public relation (PR) activity, but with a disproportionately little revenue recognition.

Analysis of a process map can enable identification of process bottlenecks, which when rectified could improve system efficiency, throughput, etc.

In this illustrative example, a designed process map is depicted along with two actual process maps. The designed process maps includes the process states (steps) as well as a designed time for a state transition (task completion).

However, in reality, for a variety of reasons, an actual process can deviate from the designed process. For example, in the actual process map represented by 1010a through 1050a, a transition from 1030a to 1040a is taking 25 days as against a design time period of 5 days. The process map can generate an alert based on an observed state transition time that deviates from a design time by a predetermined threshold.

Similarly, in the actual process map represented by 1010b through 1050b, it is determined that an additional process step 1035b ("Clarify Purchase Requisition") is detected in the process map. This event may be detected based on activity logs that may include unstructured data updates, e.g., associated with email communication logs based on emails where additional clarifications are sought via email. The detection of a deviation from the process by the addition of this process step may trigger an alert.

Figure 11:
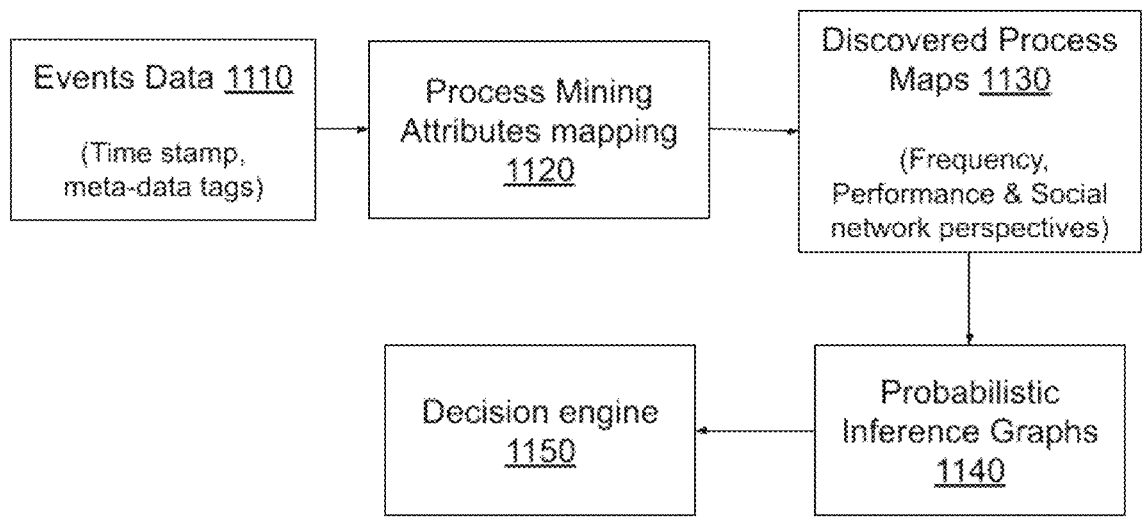
FIG. 11 is a block diagram that depicts example generation of process maps and probabilistic inference graphs from event-log data and other digital footprint data, in accordance with some implementations.

FIG. 11 is a block diagram that depicts example generation of process maps and probabilistic inference graphs from event-log data and other digital footprint data, in accordance with some implementations.

A dynamic business system is considered to be a set of interacting entities and the performance or the state of the system can be considered to be the manifestation of these interacting entities and the outcomes of their interactions. The system thus can be defined by the visible properties of interactions between these different entities. Capturing the state of the system at any given point of time provides a snapshot of the visible properties of these interacting entities and their outcomes over a segment of time in the past.

Capturing the state of the systems at multiple points in time gives us multiple snapshots of these properties. Taking the difference between these multiple snapshots or states of the system, can provide us with a set of granular events that occurred during the time period between the two snapshots. Stitching a subset of these events associated with at least one common interacting entity can give us a journey of this common interacting entity within the sub-system.

Combining several such journeys of entities of a certain kind can give us a process view of the system and enable detect bottlenecks and suggest remedial actions.

The process view of the system can help us detect anomalies and rectify them as and when they occur. The above two steps allow for improving the system on an ongoing basis and can be performed by a synthetic agent that is continually learning.

While the process adds a local perspective of the entity, the entity itself can be part of a different context, which we will call here the connections context to ensure that the process variations can be looked at from the perspective of the differences in connections and thus see if there is any dis-similarity between the entities themselves.

Automated Process Discovery

Events in addition to having a time-stamp will also be associated with other meta-data such as resources associated with the event, entities associated with the event and the transactional activity that an event signifies. The interactions are captured in events data 1110.

The set of granular events is generated by process mining 1120.

A perspective mapping engine will use meta-data attributes for process discovery and this would then be used for generating a process map 1130.

A learning engine for each process identifies outcome metrics and creates a probabilistic graph that outlines how the state changes occur within any process. The Probabilistic graph 1140 is used as a store for learning.

Figure 12:
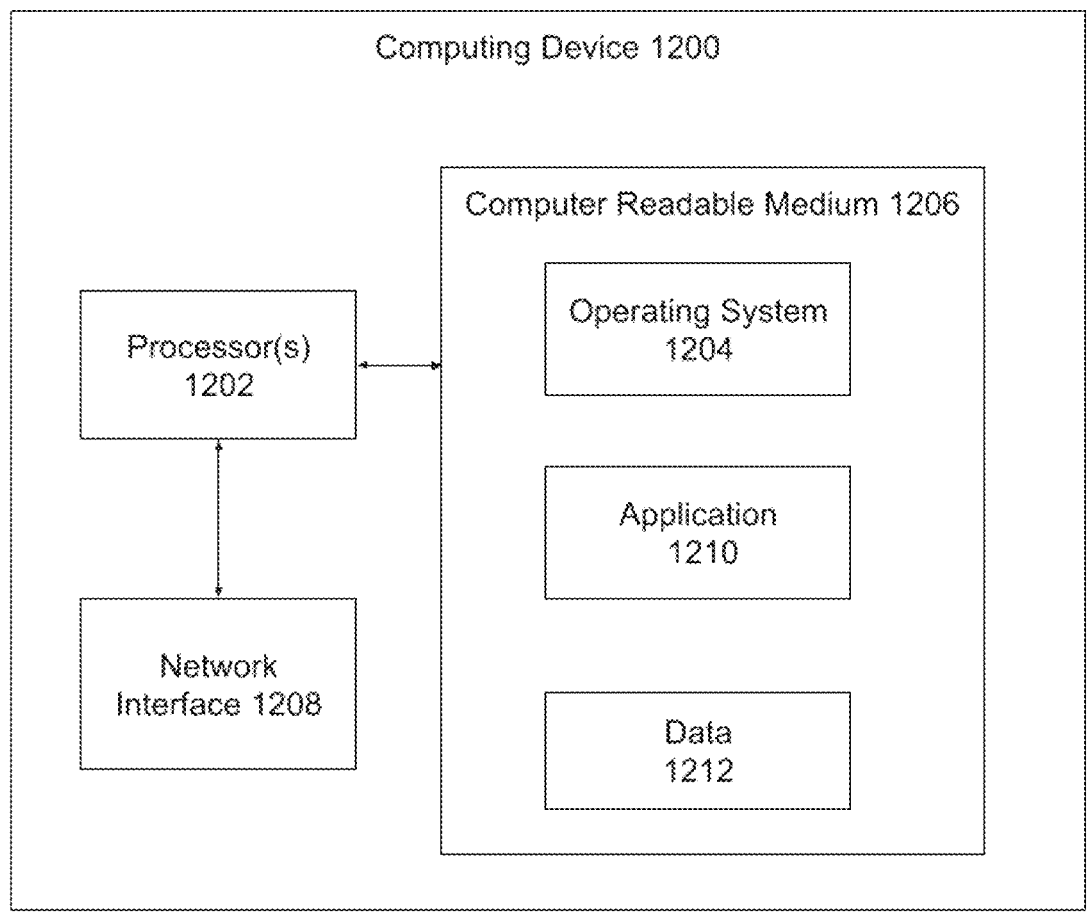
FIG. 12 is a block diagram illustrating an example computing device, in accordance with some implementations.

A decision engine 1150 utilizes the Probabilistic Inference Graphs as the input to generate outputs; Anomaly decisions, Prediction Decisions, Recommendation Decisions, and Forecasting Decisions FIG. 12—Computing Device FIG. 12 is a block diagram of an example computing device 1000 which may be used to implement one or more features described herein. In one example, device 1000 may be used to implement a computer device (e.g. 102, 114, or 120 of FIG. 1A), and perform appropriate method implementations described herein. Computing device 1200 can be any suitable computer system, server, or other electronic or hardware device. For example, the computing device 1200 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1200 includes a processor 1202, a memory 1204, input/output (I/O) interface 1206, and audio/video input/output devices 1214.

Processor 1202 can be one or more processors and/or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1206 is typically provided in device 1200 for access by the processor 1202, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the server device 1200 by the processor 1202, including an operating system 1204, one or more applications 1210 and application data 1212. In some implementations, application 1210 can include instructions that enable processor 1202 to perform the functions (or control the functions of) described herein, e.g., some or all of the methods described with respect to FIG. 7, 8, or 11.

Elements of software in memory 1206 can alternatively be stored on any other suitable storage location or computer-readable medium. In addition, memory 1206 (and/or other connected storage device(s)) can store instructions and data used in the features described herein. Memory 1206 and any other type of storage (magnetic disk, optical disk, magnetic tape, or other tangible media) can be considered "storage" or "storage devices."

An I/O interface can provide functions to enable interfacing the server device 1200 with other systems and devices. For example, network communication devices, storage devices (e.g., memory and/or data store 118), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 12 shows one block for each of processor 1202, memory 1206. These blocks may represent one or more processors or processing circuitries, operating systems, memories, I/O interfaces, applications, and/or software engines. In other implementations, device 1200 may not have all of the components shown and/or may have other elements including other types of elements instead of, or in addition to, those shown herein. While the processing system 102 is described as performing operations as described in some implementations herein, any suitable component or combination of components of processing system 102 or similar system, or any suitable processor or processors associated with such a system, may perform the operations described.

A user device can also implement and/or be used with features described herein. Example user devices can be computer devices including some similar components as the device 1200, e.g., processor(s) 1202, memory 1206, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1200 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 750) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device, laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, the method comprising:
   receiving, at a processor, a first activity log associated with a first enterprise sub-process of an enterprise process for a first time period, wherein the first activity log includes entity data of one or more entities and associated interaction data of the one or more entities, and wherein the first activity log includes a first set of attributes for the one or more entities;
   receiving, at the processor, a second activity log associated with a second enterprise sub-process of the enterprise process, wherein the second activity log includes entity data of the one or more entities and associated interaction data of the one or more entities, and wherein the second activity log includes a second set of attributes different from the first set of attributes for the one or more entities;
   persisting the associated interaction data of the one or more entities included in the first activity log and the second activity log as an event log in a time series database, wherein the event log stores the associated interaction data and time stamp data;
   determining, at the processor, change context data based on a comparison of the entity data and the associated interaction data with corresponding entity data and associated interaction data of a second time period;
   analyzing the change context data to determine atomic event data associated with the enterprise process based on detection of one or more of: a change in state of the one or more entities or a change in state of one or more interactions of the one or more entities included in the change context data, wherein analyzing the change context data comprises applying a noise removal filter and applying a knowledge graph of rules to the change context data;
   providing the atomic event data associated with the enterprise process as input to a first trained machine learning model;
   determining, using the first trained machine learning model and the atomic event data, a predicted future state of the enterprise process, wherein determining the predicted future state of the enterprise process comprises determining, using unsupervised learning, a joint-probability distribution of one or more parameters of the enterprise process;
   generating, utilizing supervised learning by a second trained machine learning model, based on the predicted future state of the enterprise process, a recommendation of an action to be performed;
   transmitting, the recommendation to one or more data sinks associated with the enterprise process; and
   automatically performing the action by an automated agent or bot associated with the enterprise process.

2. The method of claim 1, further comprising:
   prior to receiving the first activity log and the second activity log, providing as input to a first machine learning model, data that includes one or more training activity logs and realized states of the enterprise process corresponding to the training activity logs;

generating, by the first machine learning model, one or more predicted states of the enterprise process;
comparing the one or more predicted states with respective realized states of the enterprise process; and
adjusting one or more parameters of the first machine learning model based on the comparison.

3. The method of claim 1, wherein the analyzing the change context data to determine atomic event data comprises:
identifying change context data elements in the change context data that are associated with a particular entity;
determining a subset of the change context data elements that are associated with a change in state of the particular entity; and
classifying the subset of change context data elements as an atomic event for the particular entity.

4. The method of claim 1, further comprising generating a process map based on the event data, wherein generating the process map comprises:
obtaining event data of one or more entities included in the event data;
for each of the one or more entities:
ordering the event data for a respective entity based on timestamps included in the event data; and
determining a frequency of occurrence of one or more events in the event data for the respective entity;
aggregating the ordered event data and the frequency of occurrence;
generating the process map based on the aggregated ordered event data and the frequency of occurrence; and
storing the process map in a graph database.

5. The method of claim 4, further comprising:
obtaining, from a graph database, a reference process map for the enterprise process;
comparing the process map to the reference process map to determine a deviation; and
generating a fraud alert based on a determination that the deviation meets a threshold deviation.

6. The method of claim 1, further comprising generating a state transition model for the enterprise process, wherein generating the state transition model comprises:
identifying one or more states of a plurality of entities included in the atomic event data;
determining a frequency of occurrence of a respective state transition between the one or more states for each of the plurality of entities; and
determining a combined state transition probability for each of the states based on aggregating the respective state transitions across the plurality of entities.

7. The method of claim 6, wherein determining the predicted future state comprises simulating a predicted future state of the enterprise process based on a current state of the enterprise process and the state transition model for the enterprise process.

8. The method of claim 6, further comprising determining a joint probability distribution of one or more parameters indicative of a state of the enterprise process based on the one of more states of the plurality of entities and one or more interaction states of the plurality of entities.

9. The method of claim 8, wherein generating the recommendation comprises:
obtaining the one or more parameters corresponding to the predicted future state of the enterprise process;
comparing the one or more parameters to corresponding predetermined threshold values for the one or more parameters; and
generating the recommendation based on any one of the one or more parameters not meeting the predetermined threshold values.

10. The method of claim 6, further comprising determining conditional state transition probabilities for each of the one or more states conditioned on entity metadata associated with each of the one or more states.

11. The method of claim 10, further comprising generating the recommendation for an entity based on a particular conditional state transition probability of a state of the entity and a determination that performing the recommendation is associated with a preferred predicted future state of the enterprise process.

12. The method of claim 1, wherein the enterprise process is a manufacturing process, and wherein receiving the activity log associated with one or more enterprise sub-processes comprises receiving sensor data from one or more sensors installed in equipment utilized in the manufacturing process.

13. A system comprising:
a memory with instructions stored thereon; and
a processing device, coupled to the memory, the processing device configured to access the memory and execute the instructions, wherein the instructions cause the processing device to perform operations including:
receiving, at a processor, a first activity log associated with one or more enterprise sub-processes of an enterprise process for a first time period, wherein the first activity log includes entity data of one or more entities and associated interaction data of the one or more entities, and wherein the first activity log includes a first set of attributes for the one or more entities;
receiving, at the processor, a second activity log associated with a second enterprise sub-process of the enterprise process, wherein the second activity log includes entity data of the one or more entities and associated interaction data of the one or more entities, and wherein the second activity log includes a second set of attributes different from the first set of attributes for the one or more entities;
persisting the associated interaction data of the one or more entities included in the first activity log and the second activity log as an event log as an event log in a time series database, wherein the event log stores the associated interaction data and time stamp data;
determining, at the processor, change context data based on a comparison of the entity data and the associated interaction data with corresponding entity data and associated interaction data of a second time period;
analyzing the change context data to determine atomic event data associated with the enterprise process based on detection of one or more of: a change in state of the one or more entities or a change in state of one or more interactions of the one or more entities included in the change context data, wherein analyzing the change context data comprises applying a noise removal filter and applying a knowledge graph of rules to the change context data;
providing the atomic event data associated with the enterprise process as input to a first trained machine learning model;
determining, using the first trained machine learned model and the atomic event data, a predicted future state of the enterprise process, wherein determining the predicted future state of the enterprise process comprises determining, using unsupervised learning, a joint-probability distribution of one or more parameters of the enterprise process; and generating, utilizing supervised learning by a second trained machine learning model, based on the predicted future state of the enterprise process, a recommendation of an action to be performed; and automatically performing the action by an automated agent or bot associated with the enterprise process.

14. The system of claim 13, further comprising one or more data sinks associated with the enterprise process, and wherein the operations further include transmitting, the recommendation to one or more data sinks associated with the enterprise process.

15. The system of claim 13, wherein the analyzing the change context data to determine event data comprises:

identifying change context data elements in the change context data that are associated with a particular entity;

determining a subset of the change context data elements that are associated with a change in state of the particular entity; and classifying the subset of change context data elements as event data for the particular entity.

16. The system of claim 13, wherein generating the recommendation comprises generating a recommendation for the performance of an automated action within the enterprise process that is determined to optimize one or more parameters indicative of a state of the enterprise process.

17. The system of claim 13, further comprising a delta storage database to store the change context data.

* * * * *